(12) United States Patent
Malec et al.

(10) Patent No.: US 11,732,771 B2
(45) Date of Patent: Aug. 22, 2023

(54) HYDRAULIC DAMPER ASSEMBLY AND A PISTON FOR A HYDRAULIC DAMPER ASSEMBLY

(71) Applicant: BeijingWest Industries Co., Ltd., Beijing (CN)

(72) Inventors: Arkadiusz Malec, Cracow (PL); Piotr Stanislaw Suprewicz, Cracow (PL); Mateusz Sarapata, Cracow (PL); Waldemar Jaroslaw Ryndak, Cracow (PL); Dominik Jaroslaw Kasprzyk, Karkow (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 220 days.

(21) Appl. No.: 17/123,061

(22) Filed: Dec. 15, 2020

(65) Prior Publication Data

US 2022/0128114 A1   Apr. 28, 2022

(30) Foreign Application Priority Data

Oct. 28, 2020   (CN) .......................... 202011175051.X

(51) Int. Cl.
*F16F 9/19*   (2006.01)
*F16F 9/32*   (2006.01)
(Continued)

(52) U.S. Cl.
CPC .............. *F16F 9/19* (2013.01); *F16F 9/3214* (2013.01); *F16F 9/3221* (2013.01);
(Continued)

(58) Field of Classification Search
CPC .......... F16F 9/19; F16F 9/3214; F16F 9/3221; F16F 9/3228; F16F 9/3235; F16F 9/3405;
(Continued)

(56) References Cited

U.S. PATENT DOCUMENTS 3,175,645 A   3/1965   Schafer et al.
3,563,557 A   2/1971   Doutt
(Continued)

FOREIGN PATENT DOCUMENTS

CN   104813062 A   7/2015
CN   107208726 A   9/2017
(Continued)

OTHER PUBLICATIONS

First Office Action and Search Report dated Oct. 9, 2021 for counterpart Chinese Patent Application No. 202011175051.X, along with machine EN translation downloaded from EPO.
(Continued)

*Primary Examiner* — Xuan Lan Nguyen
(74) *Attorney, Agent, or Firm* — William H. Honaker; Dickinson Wright PLLC

(57) ABSTRACT

A hydraulic damper assembly comprises a housing extending between a first end and a second end. A main piston is slidably disposed in the fluid chamber dividing the fluid chamber into a first chamber and a second chamber. A piston rod extends along a center axis and attaches to the main piston. An additional piston is coupled to the piston rod and axially spaced from the main piston. The additional piston includes a main body defining a compression channel and a rebound channel that allow fluid to flow through the additional piston. A securing member secures the additional piston to the piston rod and defines an outer groove. A piston ring is located in the outer groove between the additional piston and the securing member. The piston ring is radially spaced from the securing member to allow the piston ring to be in engagement with the housing.

30 Claims, 16 Drawing Sheets

(51) Int. Cl.
*F16F 9/34* (2006.01)
*F16F 9/36* (2006.01)
*F16F 9/58* (2006.01)
*B60G 13/08* (2006.01)
*B60G 17/08* (2006.01)
*F16F 9/18* (2006.01)

(52) U.S. Cl.
CPC .......... *F16F 9/3228* (2013.01); *F16F 9/3235* (2013.01); *F16F 9/3405* (2013.01); *F16F 9/368* (2013.01); *F16F 9/585* (2013.01); *B60G 13/08* (2013.01); *B60G 17/08* (2013.01); *B60G 2202/24* (2013.01); *B60G 2204/62* (2013.01); *B60G 2206/41* (2013.01); *B60G 2500/10* (2013.01); *B60G 2800/162* (2013.01); *F16F 9/185* (2013.01); *F16F 2222/12* (2013.01); *F16F 2228/066* (2013.01); *F16F 2230/0005* (2013.01); *F16F 2230/42* (2013.01); *F16F 2232/08* (2013.01); *F16F 2234/04* (2013.01)

(58) Field of Classification Search
CPC ........ F16F 9/368; F16F 9/585; F16F 2222/12; F16F 2228/066; F16F 2230/0005; F16F 2230/42; F16F 2232/08; F16F 2234/04
See application file for complete search history.

(56) References Cited

U.S. PATENT DOCUMENTS

| | | | |
|---|---|---|---|
| 4,821,850 A | 4/1989 | Geiling et al. | |
| 5,148,897 A | 9/1992 | Vanroye | |
| 6,782,979 B1 | 8/2004 | Gold et al. | |
| 6,883,649 B2 | 4/2005 | Lun | |
| 9,068,618 B2 | 6/2015 | Yu | |
| 9,273,746 B2 | 3/2016 | Chen et al. | |
| 9,605,726 B2* | 3/2017 | Baldoni | F16F 9/49 |
| 9,657,803 B2* | 5/2017 | Slusarczyk | B21D 22/20 |
| 9,797,466 B2 | 10/2017 | Kim et al. | |
| 9,982,739 B2 | 5/2018 | De Kock | |
| 10,107,352 B2* | 10/2018 | Grzesik | F16F 9/585 |
| 10,208,830 B2* | 2/2019 | Bruno | F16F 9/185 |
| 10,393,211 B2 | 8/2019 | Grzesik et al. | |
| 10,473,180 B2 | 11/2019 | Forster | |
| 10,527,122 B2* | 1/2020 | Kus | F16F 9/49 |
| 10,603,974 B2* | 3/2020 | Kasprzyk | F16F 9/3235 |
| 10,670,107 B2* | 6/2020 | Flacht | F16F 9/3465 |
| 10,746,252 B2* | 8/2020 | Flacht | F16F 9/34 |
| 2016/0091046 A1* | 3/2016 | Soromenho | B60G 13/08 188/297 |
| 2017/0175842 A1 | 6/2017 | Roessle et al. | |
| 2018/0195574 A1 | 7/2018 | Ishimaru et al. | |
| 2019/0322151 A1 | 10/2019 | Kasprzyk et al. | |

FOREIGN PATENT DOCUMENTS

| | | | | |
|---|---|---|---|---|
| CN | 107429774 A | 12/2017 | | |
| CN | 108253073 A | 7/2018 | | |
| CN | 108603559 A | 9/2018 | | |
| CN | 108757811 A | 11/2018 | | |
| CN | 110081115 A | 8/2019 | | |
| CN | 111765194 A | 10/2020 | | |
| DE | 4022098 C1 | 7/1991 | | |
| DE | 102013008887 A1 * | 11/2014 | | F16F 9/18 |
| DE | 102016221980 A1 | 5/2018 | | |
| EP | 3239556 A1 | 1/2017 | | |
| EP | 3537002 A1 | 9/2019 | | |
| GB | 1305311 A | 1/1973 | | |
| JP | 60118036 U | 8/1985 | | |
| JP | 2001090767 A | 4/2001 | | |
| JP | 2015518120 A | 6/2015 | | |

OTHER PUBLICATIONS

Second Office Action and Search Report dated Feb. 25, 2022 for counterpart Chinese patent application No. 202011175051.X, along with machine EN translation downloaded from EPO.
Invitation pursuant to Rule 62a(1) EPC and Rule 63(1) EPC dated Apr. 5, 2022 for counterpart European patent application No. 21203956.4.
Extended European Search Report dated Oct. 11, 2022 for counterpart European patent application No. 21203956.4.

* cited by examiner

HYDRAULIC DAMPER ASSEMBLY AND A PISTON FOR A HYDRAULIC DAMPER ASSEMBLY

CROSS-REFERENCE TO RELATED APPLICATIONS

This present application claims priority to Chinese Patent Application Serial No. 202011175051.X filed Oct. 28, 2020, the entire disclosure of which is hereby incorporated herein by reference.

BACKGROUND OF THE INVENTION

1. Field of the Invention

The present invention generally relates to a hydraulic damper assembly and a piston for the hydraulic damper assembly.

2. Description of the Prior Art

A hydraulic damper assembly including a hydraulic compression stop generates an additional damping force over a predefined section of the piston rod as the piston rod travels during a compression stroke. Traditionally, a hydraulic damper assembly for a vehicle is provided with a first end stop member, which is arranged inside the hydraulic damper assembly and is configured to operate during the rebound stroke of the hydraulic damper assembly, and a second end stop member, which is arranged outside the shock-absorber and is configured to operate during the compression stroke of the hydraulic damper assembly. The end stop members may be of elastic or hydraulic type.

The hydraulic damper assemblies typically include a housing disposed on a center axis extending between a first end and a second end. The housing defines a fluid chamber extending along the center axis for containing a working fluid. A main piston is slidably disposed in the fluid chamber dividing the fluid chamber into a first chamber and a second chamber. The first chamber extends between the first end and the main piston. The second chamber extends between the second end and the main piston. A piston rod extends along the center axis and attaches to the main piston for moving the main piston between a compression stroke and a rebound stroke. An additional piston, located in the fluid chamber, is coupled to the piston rod and is axially spaced from the main piston to provide an additional damping force during the compression stroke and the rebound stroke. The additional piston includes a main body. The main body defines a compression channel and a rebound channel for allowing the working fluid to flow through the additional piston during the compression stroke and the rebound stroke, respectively. A piston ring is disposed in an outer groove of the additional piston to engage the housing to align the additional piston with the housing.

Typically, the piston ring can be movable both radially and axially in the outer groove to align the additional piston with the housing and to control fluid flow through the additional piston. During operation, the piston ring tends to bend when entering an insert of a hydraulic compression stop or engaging a narrowed portion of the housing of the hydraulic damper. As a result, this causes a squeaking noise during the operation of the hydraulic damper assembly and causes the piston ring to become extruded between the housing and additional piston.

SUMMARY OF THE INVENTION

The present invention in the broadest aspect provides for a hydraulic damper assembly that is constructed to withstand high damping forces without piston ring extrusion. The present invention also provides a hydraulic damper assembly that has a reduced noise generation during operation. The present invention further provides a durable piston ring interface wherein the hydraulic damper assembly provides a smooth compression stroke.

It is one aspect of the present invention to provide a hydraulic damper assembly. The hydraulic damper assembly comprises a housing disposed on a center axis extending between a first end and a second end. The housing defines a fluid chamber extending along the center axis for containing a working fluid. A main piston is slidably disposed in the fluid chamber dividing the fluid chamber into a first chamber and a second chamber. The first chamber extends between the first end and the main piston. The second chamber extends between the second end and the main piston. A piston rod extends along the center axis and attaches to the main piston for moving the main piston between a compression stroke and a rebound stroke. An additional piston, located in the fluid chamber, is coupled to the piston rod and is axially spaced from the main piston to provide an additional damping force during the compression stroke and the rebound stroke. The additional piston includes a main body. The main body defines a compression channel and a rebound channel for allowing the working fluid to flow through the additional piston during the compression stroke and the rebound stroke, respectively. A securing member attaches to the piston rod for securing the additional piston to the piston rod. The securing member defines an outer groove extending radially inwardly toward the center axis. A piston ring is located in the outer groove between the additional piston and the securing member. The piston ring is radially spaced from the securing member to allow the piston ring to move radially between an expanded position and a compression position. The expanded position is defined as the piston ring being spaced from the housing. The compressed position is defined as the piston ring being in engagement with housing to align the additional piston with the housing.

It is one aspect of the present invention to provide a hydraulic damper assembly. The hydraulic damper assembly comprises a housing disposed on a center axis extending between a first end and a second end. The housing defines a fluid chamber extending along the center axis for containing a working fluid. A main piston is slidably disposed in the fluid chamber dividing the fluid chamber into a first chamber and a second chamber. The first chamber extends between the first end and the main piston. The second chamber extends between the second end and the main piston. A piston rod extends along the center axis and attaches to the main piston for moving the main piston between a compression stroke and a rebound stroke. An additional piston, located in the fluid chamber, couples to the piston rod and is axially spaced from the main piston to provide an additional damping force during the compression stroke and the rebound stroke. The additional piston includes a main body. The main body defines a compression channel and a rebound channel for allowing the working fluid to flow through the additional piston during the compression stroke and the rebound stroke, respectively. The additional piston defines a stepped groove extending radially inwardly toward the center axis. The piston ring has a sleeve portion and a middle portion. The middle portion extends radially outwardly from the sleeve portion for engaging the housing. The stepped groove includes a first groove having a first width and a second groove having a second width. The second groove is disposed radially inwardly from the first groove. The piston ring is radially moveable between an expanded position and a compressed position. In the expanded position, the middle portion is spaced from the housing. In the compressed position, the piston ring engages the housing to align the additional piston with the housing. The first width is greater than the second width to prevent the sleeve portion from flexing radially inwardly.

It is one aspect of the present invention to provide a hydraulic damper assembly. The hydraulic damper assembly comprises a housing disposed on a center axis extending between a first end and a second end. The housing defines a fluid chamber extending along the center axis for containing a working fluid. A main piston is slidably disposed in the fluid chamber, movable along the center axis, dividing the fluid chamber into a first chamber and a second chamber. A piston rod extends along the center axis and attaches to the main piston for moving the main piston between a compression stroke and a rebound stroke. An additional piston, located in the fluid chamber, couples to the piston rod and is axially spaced from the main piston to provide an additional damping force during the compression stroke and the rebound stroke. The additional piston includes a main body defining a compression channel and a rebound channel for allowing fluid to flow through the additional piston during the compression stroke and the rebound stroke, respectively. The additional piston includes a plurality of fingers spaced from one another and extending outwardly from the main body. At least one retainer is axially spaced from the additional piston and has a central hole for receiving the plurality of fingers. The central hole is in fluid communication with one of the compression channel and the rebound channel.

It is one aspect of the present invention to provide a hydraulic damper assembly. The hydraulic damper assembly comprises a housing disposed on a center axis extending between a first end and a second end. The housing defines a fluid chamber extending along the center axis for containing a working fluid. A main piston is slidably disposed in the fluid chamber, movable along the center axis, dividing the fluid chamber into a first chamber and a second chamber. A piston rod extends along the center axis and attaches to the main piston for moving the main piston between a compression stroke and a rebound stroke. An additional piston, located in the fluid chamber, couples to the piston rod and is axially spaced from the main piston to provide an additional damping force during the compression stroke and the rebound stroke. The additional piston includes a main body defining a compression channel and a rebound channel for allowing fluid to flow through the additional piston during the compression stroke and the rebound stroke, respectively. The main body includes a bottom portion and a top portion engaging one another. A bottom mating member extends outwardly from the bottom portion toward the top portion and has a first end face. A bottom mating surface extends between the bottom mating member and the first end face. A top mating member extends outwardly from the top portion toward the bottom portion and has a second end face. A top mating surface extends between the top mating member and the second end face. A piston ring is sandwiched between the top portion and the bottom portion. The piston ring is radially moveable between an expanded position and a compressed position. In the expanded position, the piston ring is spaced from the housing. In the compressed position, the piston ring is in engagement with the housing. The bottom mating member and the top mating member are oriented opposite one another and engage one another along the bottom mating surface and the top mating surface.

It is one aspect of the present invention to provide an additional piston for displacement in a housing of a hydraulic damper assembly. The additional piston comprises a main body extending about a center axis defining a compression channel and a rebound channel for allowing fluid to flow through the additional piston during a compression stroke and a rebound stroke, respectively. The main body includes a bottom portion and a top portion that engage one another to establish the main body and define a hollow extending between the bottom portion and the top portion. A rebound retainer defines a first central hole and a plurality of passages radially spaced from the first central hole. The first central hole is in fluid communication with the compression channel. The plurality of passages is in fluid communication with of the rebound channel. The rebound retainer includes a collar extending about the center axis to define a cavity for receiving the main body. The cavity is in fluid communication with the rebound channel, the hollow, and the plurality of passages.

It is one aspect of the present invention to provide an additional piston for displacement in a housing of a hydraulic damper assembly. The additional piston comprises a main body extending about the center axis. The main body defines a compression channel and a rebound channel for allowing fluid to flow through the additional piston during a compression stroke and a rebound stroke, respectively. The main body includes a bottom portion and a top portion that engage one another to establish the main body and define a hollow extending between the bottom portion and the top portion. A rebound retainer defines a first central hole and a plurality of passages spaced radially outwardly from the first central hole. The first central hole is in fluid communication with the compression channel. The plurality of passages is in fluid communication with the rebound channel. The rebound retainer includes a collar extending about the center axis to define a cavity for receiving the main body. A valve stack disposed in the cavity for controlling fluid flow through the additional piston. The rebound retainer includes at least one vane extending radially inwardly from the collar to limit deflection of the valve stack.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
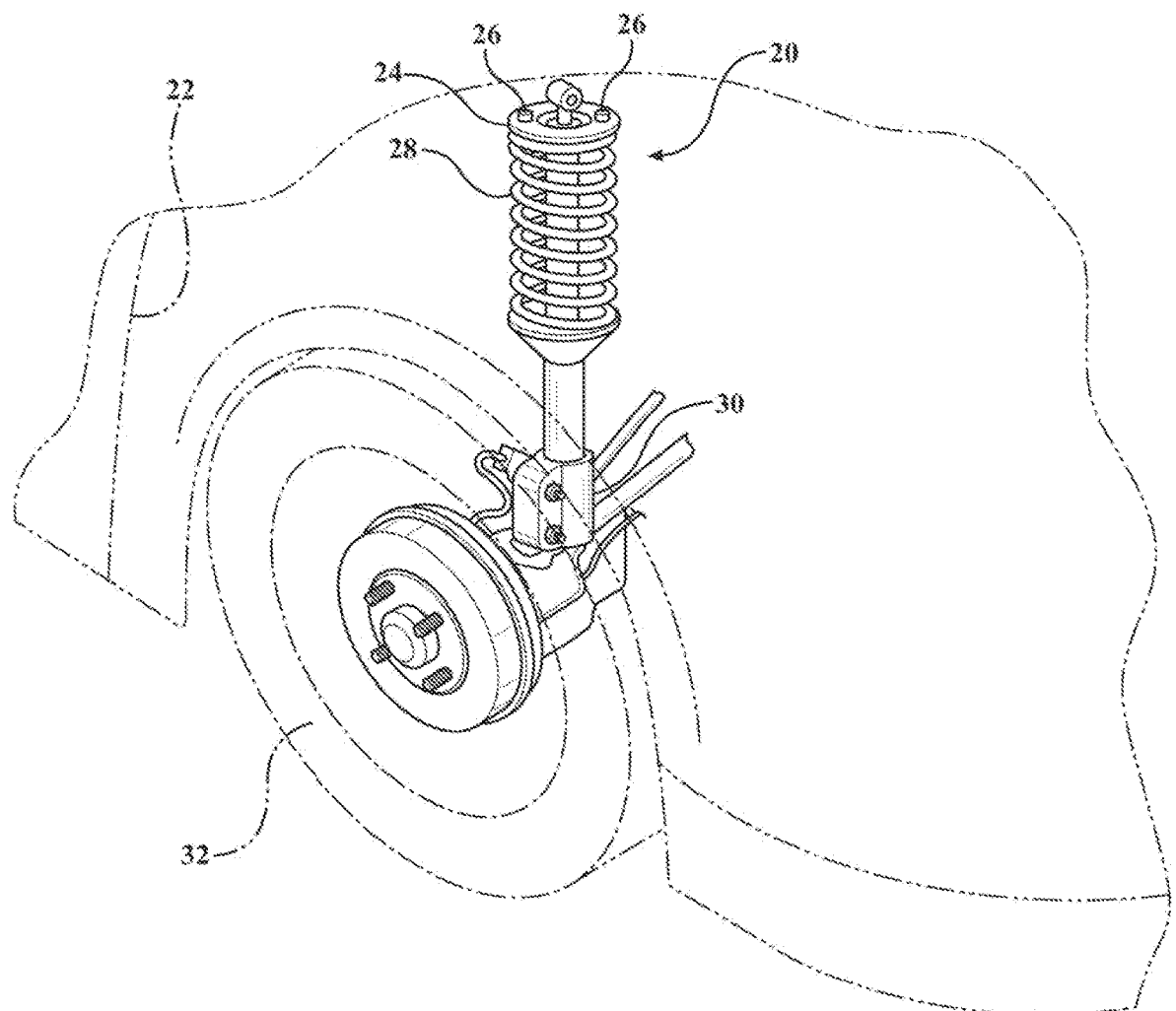
FIG. 1 is a fragmentary view of a vehicle suspension including a hydraulic damper assembly constructed in accordance with an embodiment of the present invention.
Figure 2:
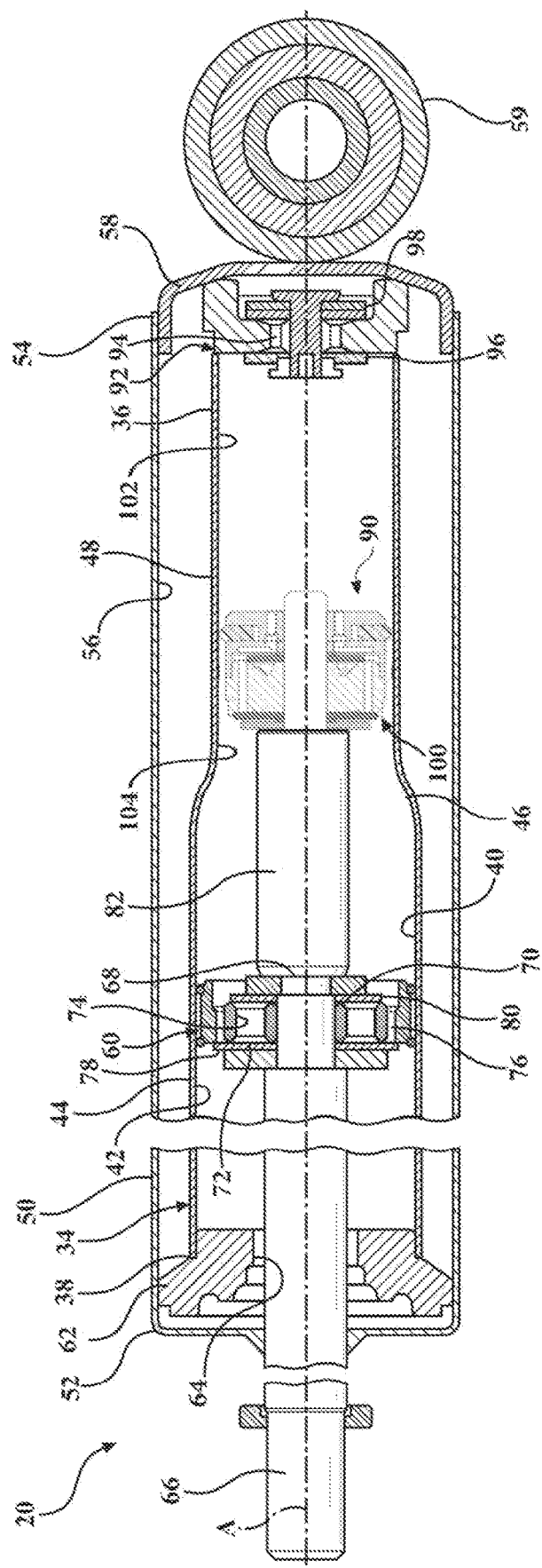
FIG. 2 is a cross-sectional perspective view of the hydraulic damper assembly including a hydraulic compression stop constructed according to an embodiment of the present invention.
Figure 3:
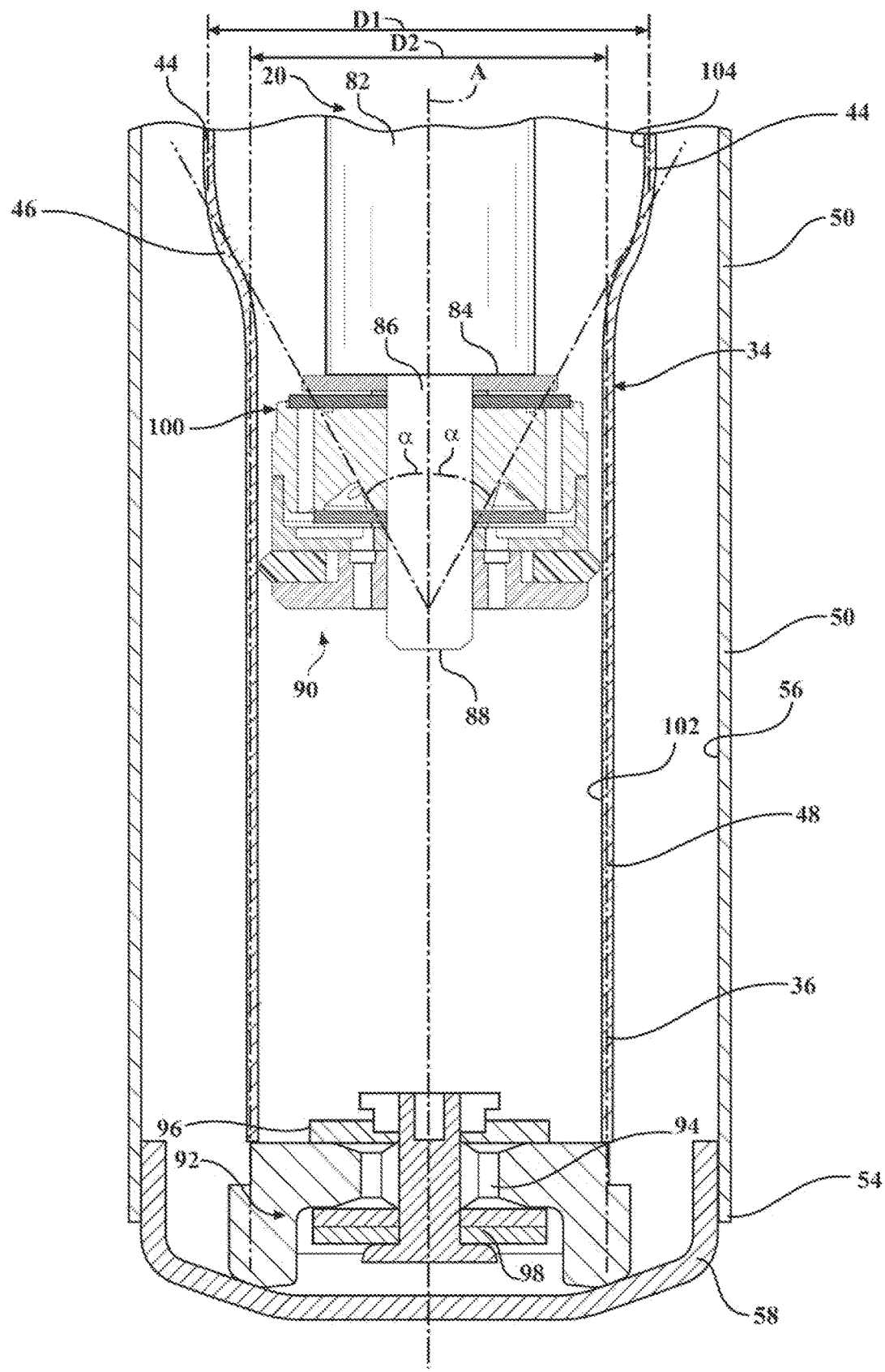
FIG. 3 is a cross-sectional exploded view of the hydraulic damper assembly including the hydraulic compression stop according to an embodiment of the present invention.

Referring to the Figures, wherein like numerals indicate corresponding parts throughout the several views, a hydraulic damper assembly 20 constructed in accordance with an embodiment of the present invention is generally shown in FIGS. 1-3.

FIG. 1 illustrates a fragment of an exemplary vehicle suspension including the hydraulic damper assembly 20 being attached to a vehicle chassis 22 via a top mount 24 and a number of screws 26 disposed on a periphery of an upper surface of the top mount 24. The top mount 24 connects to a coil spring 28. The hydraulic damper assembly 20 connects to the steering knuckle 30 supporting vehicle wheel 32. It should be noted that the hydraulic damper assembly 20 of the present invention can be a low damping hydraulic damper or a high damping hydraulic damper.

According to an embodiment of the present invention, a low damping hydraulic damper 20 is shown in FIGS. 2-3. The low damping hydraulic damper 20 includes a housing 34, having a generally cylindrical shape, disposed on a center axis A. The housing 34 extends annularly about the center axis A between a first end 36 and a second end 38. The housing 34 defines a fluid chamber 40, 42 extending along the center axis A between the first end 36 and the second end 38 for containing a working fluid. According to an embodiment of the present invention, the housing 34 has a main portion 44, an intermediary portion 46, and a narrowed portion 48. The main portion 44, having a first predetermined diameter $D_1$, extends from the second end 38 toward the first end 36. The narrowed portion 48, axially spaced from the main portion 44 and having a second predetermined diameter $D_2$, extends from the first end 36 toward the second end 38 wherein the second predetermined diameter $D_2$ is less than the first predetermined diameter $D_1$. The intermediary portion 46 extends between the main portion 44 and the narrowed portion 48 at predetermined angle α relative to the center axis A to couple the main portion 44 to the narrowed portion 48. According to an embodiment of the present invention, the predetermined angle α is less than 90° to provide a smooth transition from the main portion 44 to the narrowed portion 48, i.e. the intermediary portion 46 provides a smooth transition from the first predetermined diameter $D_1$ of main portion 44 to the second predetermined diameter $D_2$ of the narrowed portion 48.

An external tube 50, having a generally cylindrical shape, is located on the center axis A radially spaced apart from the housing 34. The external tube 50 extends annularly about the center axis A between an opened end 52 and a closed end 54. The opened end 52 is located adjacent to the second end 38. The closed end 54 is adjacent to the first end 36. The housing 34 and the external tube 50 define a compensation chamber 56 extending between the housing 34 and the external tube 50 and about the center axis A. An end cap 58 is located adjacent to the first end 36 of the housing 34 attaching to the closed end 54 of the external tube 50 to close the fluid chamber 40, 42 and the compensation chamber 56. A mounting ring 59, having a generally circular shape, attaches to the end cap 58 for mounting the external tube 50 to a vehicle. It should be appreciated that the present invention is not limited to a twin-tube type hydraulic damper, the present invention can also be implemented in a single tube type hydraulic damper.

A main piston 60, having a generally cylindrical shape, is located in the fluid chamber 40, 42 and slidable in the fluid chamber 40, 42. The main piston 60 divides fluid chamber 40, 42 into a first chamber 40 and a second chamber 42. The first chamber 40 extends between the first end 36 and the main piston 60. The second chamber 42 extends between the second end 38 and the main piston 60. A piston rod guide 62 is located in the second chamber 42, adjacent to the second end 38 of the housing 34, in sealing engagement with the second end 38 of the housing 34 and the opened end 52 of the external tube 50 to close the fluid chamber 40, 42 and the compensation chamber 56. The piston rod guide 62 defines a bore 64, having a generally cylindrical shape, extending along the center axis A and in communication with the second chamber 42. A piston rod 66, having a generally cylindrical shape, extends along the center axis A through the bore 64 and into the second chamber 42 to a distal end 68. The piston rod 66 attaches to the main piston 60 at the distal end 68 for moving the main piston 60 between a compression stroke and a rebound stroke in the fluid chamber 40, 42. During the compression stroke, the piston rod 66 and the main piston 60 move towards the first end 36 of the housing 34. During the rebound stroke, the piston rod 66 and the main piston 60 move toward the second end 38 of the housing 34.

The main piston 60 has a compression surface 70 and a rebound surface 72. The compression surface 70 is located in the first chamber 40 facing the first end 36 of the housing 34. The rebound surface 72 is located in the second chamber 42 facing the second end 38 of the housing 34. The main piston 60 defines a plurality of pathways 74, 76 including a set of inner pathways 74 and a set of outer pathways 76. The inner pathways 74 are located about the center axis A, circumferentially spaced apart from one another, extending from the compression surface 70 to the rebound surface 72. The outer pathways 76 are located about the center axis A, radially spaced apart from the inner pathways 74, extending from the compression surface 70 to the rebound surface 72. In other words, the inner pathways 74 are disposed closer to the center axis A than the outer pathways 76. The pathways 74, 76 extend through the main piston 60 for allowing working fluid flow through the pathways 74, 76 during the compression stroke and the rebound stroke. A compression valve 78, including a plurality of discs with each of the discs having a generally circular shape, is located on the rebound surface 72 of the main piston 60 covering the outer pathways 76 for limiting working fluid flow through the main piston 60 during the compression stroke to provide a damping force during the compression stroke. A rebound valve 80, having a plurality of discs with each of the discs having a generally circular shape, is located on the compression surface 70 of the main piston 60 covering the inner pathways 74 for limiting working fluid flow through the main piston 60 during the rebound stroke to provide a damping force during the rebound stroke.

A piston rod extender 82, having a generally cylindrical shape, attaches to the distal end 68 of the piston rod 66 and extends along the center axis A to a terminal end 84. A threaded projection 86, having a generally cylindrical shape, extends outwardly from the terminal end 84 to a projection end 88.

A hydraulic compression stop 90, disposed in the first chamber 40, attaches to the first end 36 of the housing 34 for providing additional damping force during the compression stroke. A base valve 92 is located in the first chamber 40 and coupled to the first end 36 of the housing 34. The base valve 92 defines a plurality of conduits 94 in fluid communication with the first chamber 40 and the compensation chamber 56. The base valve 92 includes a first damping valve 96, having a plurality of discs with each of the discs having a generally circular shape, covering the conduits 94 for regulating working fluid flow from the first chamber 40 to the compensation chamber 56 during the compression stroke to provide an additional damping force. A second damping valve 98, having a plurality of discs with each of the discs having a generally circular shape, is disposed adjacent to the closed end 54 of the external tube 50 covering the conduits 94 for regulating working fluid flow to the compensation chamber 56 during the rebound stroke to provide an additional damping force.

The hydraulic compression stop 90 includes an additional piston 100, having a generally cylindrical shape, that attaches to the piston rod 66 and is axially spaced from the main piston 60. According to one arrangement, the additional piston 100 is located about the threaded projection 86 for movement with the piston rod 66 during the compression stroke and the rebound stroke to engage the narrowed portion 48 of the housing 34 during the compression stroke or the rebound stroke to provide the additional damping force. According to an embodiment of the present invention, the additional piston 100 is located in the first chamber 40 and coupled to the piston rod 66 for movement with the piston rod 66 to provide the additional damping force during the compression stroke. According to an embodiment of the present invention, the additional piston 100 can be located in the second chamber 42 and coupled to the piston rod 66 for movement with the piston rod 66 to provide the additional damping force during the rebound stroke.

The additional piston 100 may divide the fluid chamber 40, 42 into a compression chamber 102 extending between the additional piston 100 and the first end 36 and a rebound chamber 104 extending between the additional piston 100 and the piston 60. In particular, the additional piston 100 may divide the first chamber 40 into the compression chamber 102 and the rebound chamber 104. The hydraulic compression stop 90 may provide a higher damping level at the end of the compression stroke to dissipate kinetic energy and accordingly provide a smoother compression than the compression provided by a jounce bumper. In this way, the hydraulic compression stop 90 may be a function of the speed of the piston rod 66 and the position of the piston rod 66.

Figure 4:
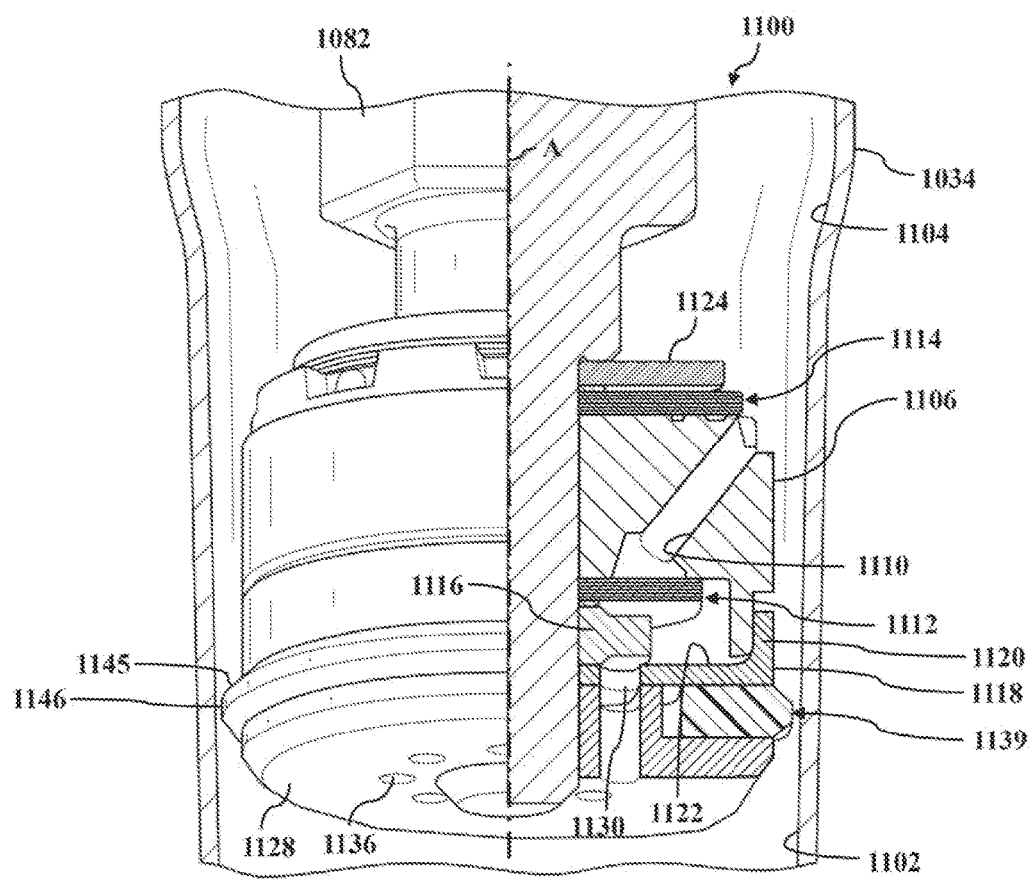
FIG. 4 is a fragmentary cross-sectional fragmentary view of a hydraulic compression stop in accordance with an embodiment the present invention.
Figure 5:
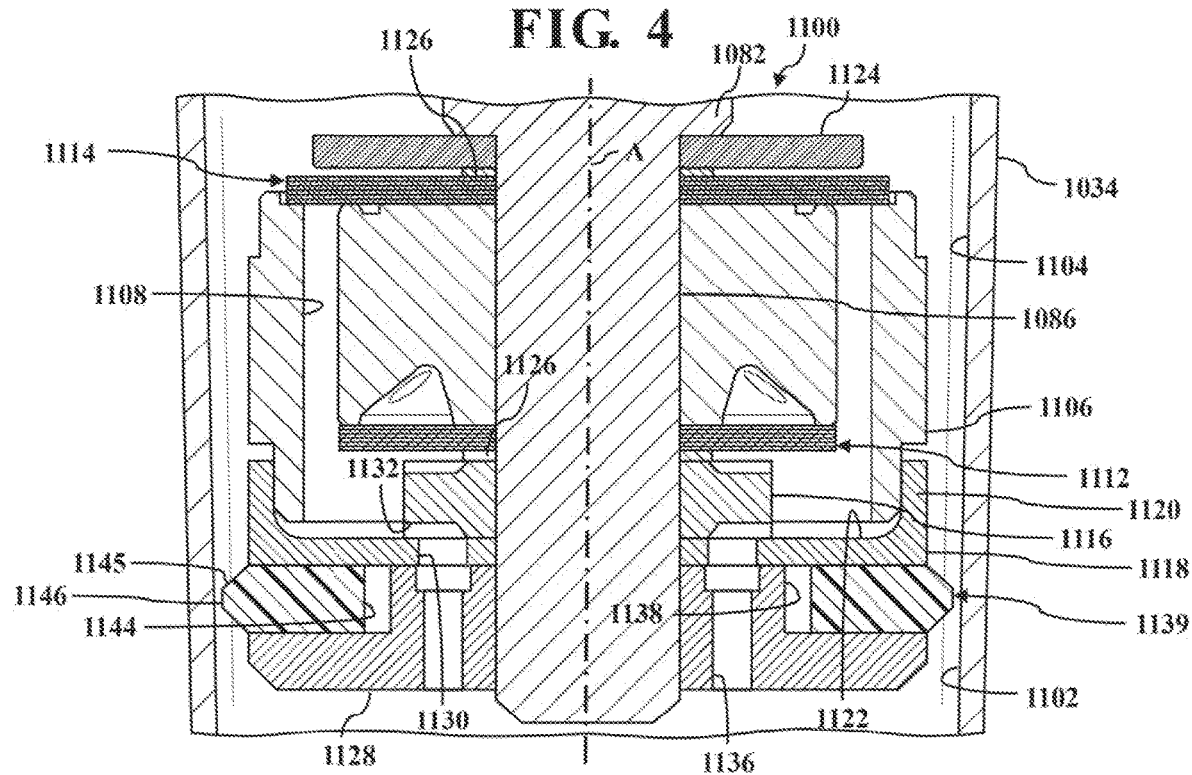
FIG. 5 is a cross-sectional view of the hydraulic compression stop in accordance with an embodiment the present invention.
Figure 6:
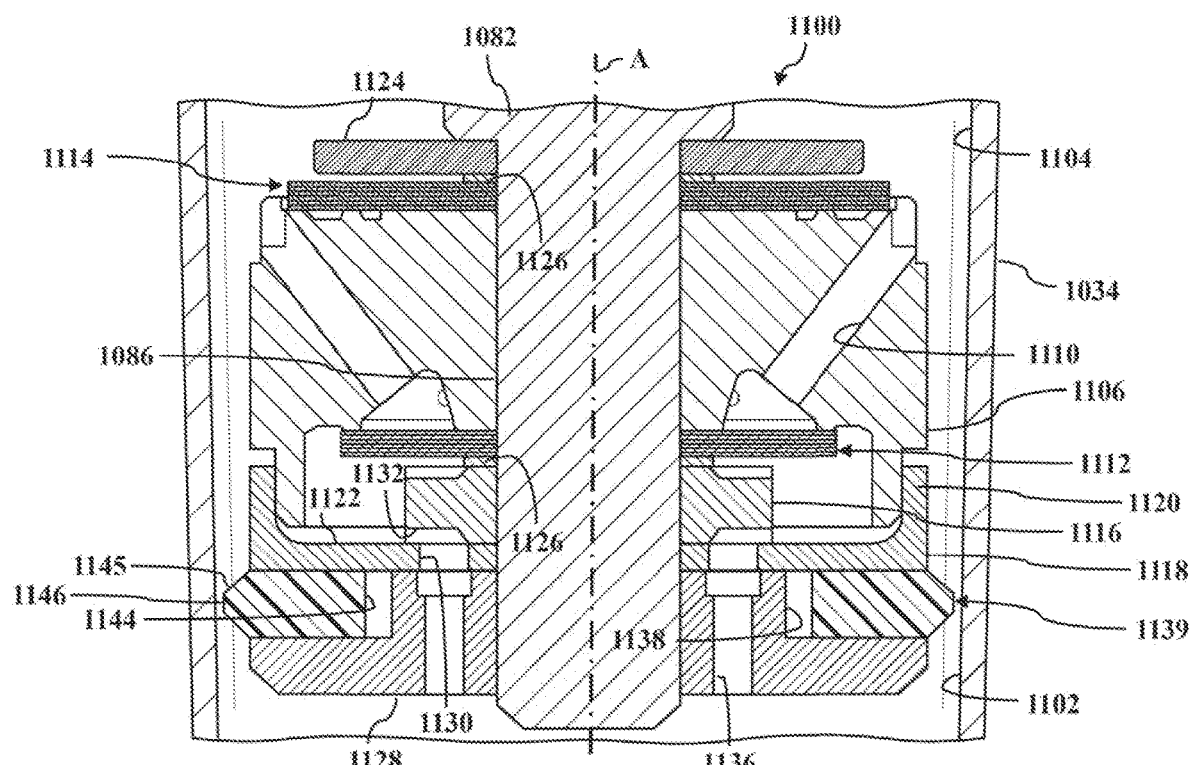
FIG. 6 is a cross-sectional view of the hydraulic compression stop in accordance with an embodiment the present invention.

According to an embodiment of the present invention as generally shown in FIGS. 4-6, the additional piston 1100 includes a main body 1106, having a generally cylindrical shape, extending about the center axis A. The main body 1106 defines a compression channel 1108 and a rebound channel 1110 for allowing fluid to flow through the additional piston 1100 during the compression stroke and the rebound stroke, respectively. A pair of valve stacks 1112, 1114, each having a generally cylindrical shape, are disposed on the center axis A and spaced apart from one another by the main body 1106. The pair of valve stacks 1112, 1114 includes a first valve stack 1112 and a second valve stack 1114, with the first valve stack 1112 engaging the main body 1106 of the additional piston 1100 and selectively covering the rebound channel 1110 to control fluid flow through the rebound channel 1110. The second valve stack 1114 engages the main body 1106 of the additional piston 1100 and selectively covers the compression channel 1108 to control fluid flow through the compression channel 1108.

An intermediate retainer 1116, having a discoidal shape, is disposed on the center axis A and extends toward the first valve stack 1112 to limit deflection of the first valve stack 1112. A rebound retainer 1118, having an annular shape, engages the intermediate retainer 1116 and includes a collar 1120 extending from a periphery of the rebound retainer 1118 about the center axis A to engage the main body 1106 and define a cavity 1122 extending between the rebound retainer 1118 and the main body 1106 for housing the working fluid. A compression retainer 1124, having an annular shape, is disposed on the center axis A adjacent the second valve stack 1114 to limit deflection of the second valve stack 1114. A pair of spacers 1126, each having an annular shape, includes one spacer 1126 sandwiched between the first valve stack 1112 and the intermediate retainer 1116 and another spacer 1126 sandwiched between the second valve stack 1114 and the compression retainer 1124. A securing member 1128, having an annular shape and coupled to the piston rod extender 1082 of the piston rod 66 for securing the additional piston 1100 to the piston rod extender 1082 of the piston rod 66, and the piston rod extender 1082 sandwich the rebound retainer 1118, the main body 1106, and the compression retainer 1124 together. The securing member 1128 may be a nut that threadedly engages the threaded projection 1086 of the piston rod extender 1082. It should be appreciated that the terminal end of the piston rod extender 1082 may be a rod tenon.

The rebound retainer 1118 defines a plurality of passages 1130 spaced circumferentially about the center axis A in fluid communication with the rebound channel 1110 and in fluid communication with the compression channel 1108. The intermediate retainer 1116 defines a plurality of slots 1132 extending radially inwardly from the cavity 1122 adjacent the plurality of passages 1130 to provide fluid communication between the plurality of passages 1130 and the cavity 1122. The securing member 1128 defines a plurality of perforations 1136 spaced circumferentially about the center axis A extending between the compression chamber 1102 and the plurality of passages 1130 to provide fluid communication between the compression chamber 1102 and the cavity 1122.

The securing member 1128 defines an outer groove 1138 extending radially inwardly toward the center axis A for receiving a piston ring 1139. The piston ring 1139 is sandwiched between the rebound retainer 1118 of the additional piston 1100 and the securing member 1128 and located in the outer groove 1138. In some embodiments, the outer groove 1138 is defined on an outer surface of the nut for receiving the piston ring 1139. The piston ring 1139 is radially spaced from the securing member 1128 to allow the piston ring 1139 to move radially between an expanded position and a compression position. The expanded position is defined as the piston ring 1139 being spaced from the housing 1034. The compressed position is defined as the piston ring 1139 being in engagement with the housing 1034 to align the additional piston 1100 with the housing 1034.

The piston ring 1139 has an interior surface 1144 and an exterior surface 1145 with the interior surface 1144 being flat and the exterior surface 1145 being tapered toward the housing 1034 to form a contacting surface 1146. In the expanded position, the contacting surface 1146 may be disposed radially outward from the additional piston 1100 to allow the piston ring 1139 to engaging the housing 1034. In this way, piston ring 1139 may align the additional piston 1100 with the housing 1034 during a compression stroke and during a rebound stroke. Because the piston ring 1139 is not axially moveable, high pressure influence may be limited on the interior surface 1144 and noise caused by movement of the piston ring 1139 may be reduced, and the piston ring 1139 may have no oil flow control function through the additional piston 1100. It should be appreciated that there may be no limitation to the number of discs (including deflection discs, orifice discs, etc.) for each of the pair of valve stacks 1112, 1114. The number of discs may not affect the axial clearance of the piston ring 1139.

Figure 7:
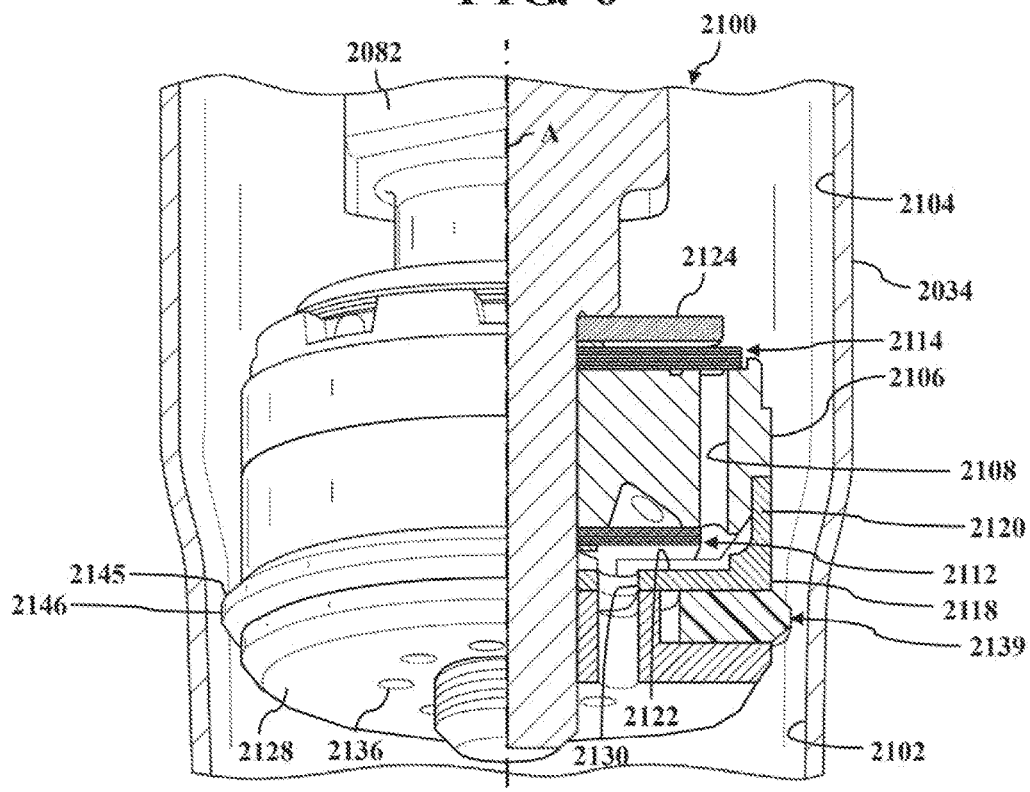
FIG. 7 is a fragmentary cross-sectional view of the hydraulic compression stop in accordance with another embodiment the present invention.
Figure 8:
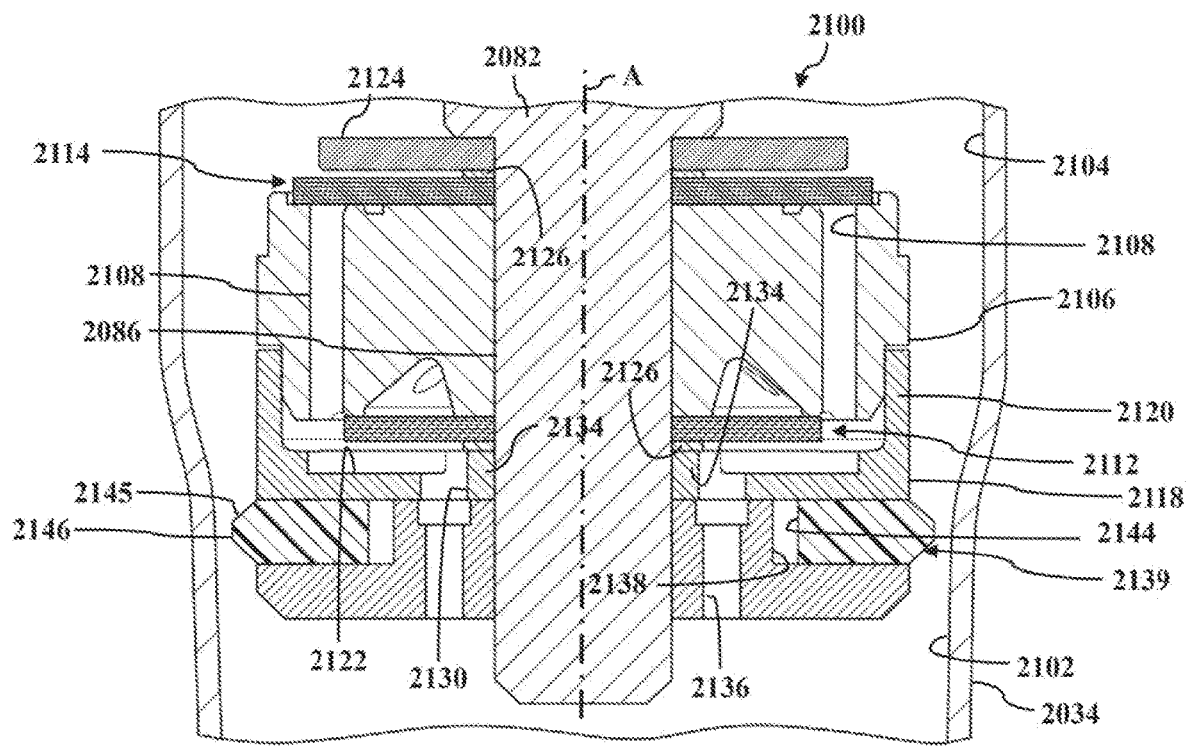
FIG. 8 is a cross-sectional view of the of the hydraulic compression stop in accordance with another embodiment the present invention.
Figure 9:
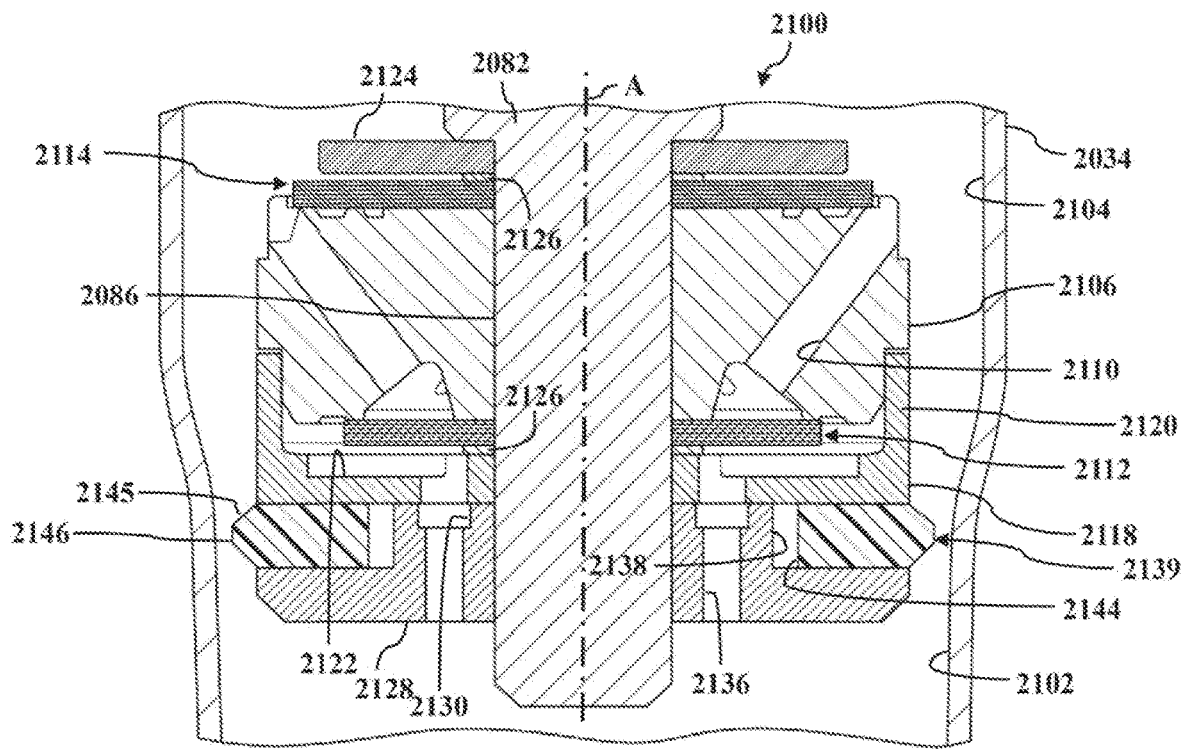
FIG. 9 is a cross-sectional view of the hydraulic compression stop in accordance with another embodiment the present invention.

According to an embodiment of the present invention as generally shown in FIGS. 7-9, the additional piston 2100 includes a main body 2106, having a generally cylindrical shape, extending about the center axis A. The main body 2106 defines a compression channel 2108 and a rebound channel 2110 for allowing fluid to flow through the additional piston 2100 during the compression stroke and the rebound stroke, respectively. A pair of valve stacks 2112, 2114, each having a generally cylindrical shape, are disposed on the center axis A and spaced apart from one another by the main body 2106. The pair of valve stacks 2112, 2114 includes a first valve stack 2112 and a second valve stack 2114, with the first valve stack 2112 engaging the main body 2106 of the additional piston 2100 and selectively covering the rebound channel 2110 to control fluid flow through the rebound channel 2110. The second valve stack 2114 engages the main body 2106 of the additional piston 2100 and selectively covers the compression channel 2108 to control fluid flow through the compression channel 2108.

A rebound retainer 2118, having an annular shape, is disposed on the center axis A and extends toward the first valve stack 2112 to limit deflection of the first valve stack 2112. A collar 2120 extends from a periphery of the rebound retainer 2118 about the center axis A to engage the main body 2106 and define a cavity 2122 extending between the rebound retainer 2118 and the main body 2106 for housing the working fluid. A compression retainer 2124, having an annular shape, is disposed on the center axis A adjacent the second valve stack 2114 to limit deflection of the second valve stack 2114. A pair of spacers 2126, each having an annular shape, includes one spacer 2126 sandwiched between the first valve stack 2112 and the rebound retainer 2118 and another spacer 2126 sandwiched between the second valve stack 2114 and the compression retainer 2124. A securing member 2128, having an annular shape and coupled to the piston rod extender 2082 of the piston rod 66 for securing the additional piston 2100 to the piston rod extender 2082 of the piston rod 66, and the piston rod extender 2082 sandwich the rebound retainer 2118, the main body 2106, and the compression retainer 2124 together. The securing member 2128 may be a nut that threadedly engages the threaded projection 2086 of the piston rod extender 2082. It should be appreciated that the terminal end of the piston rod extender 2082 may be a rod tenon.

The rebound retainer 2118 defines a plurality of passages 2130 spaced circumferentially about the center axis A to form a portion of the rebound channel 2110 and a portion of the compression channel 2108. A protrusion 2134 disposed radially inwardly from the collar 2120 adjacent the threaded projection 2086 extends along the center axis A from the rebound retainer 2118 to engage one of the pair of spacers 2126 and to allow fluid communication between the plurality of passages 2130 and the cavity 2122. The securing member 2128 defines a plurality of perforations 2136 spaced circumferentially about the center axis A extending between the compression chamber 2102 and the plurality of passages 2130 to provide fluid communication between the compression chamber 2102 and the cavity 2122.

The securing member 2128 defines an outer groove 2138 extending radially inwardly toward the center axis A for receiving a piston ring 2139. In some embodiments, the outer groove 2138 is defined on an outer surface of the nut for receiving the piston ring 2139. The piston ring 2139 is located in the outer groove 2138 and is radially spaced from the securing member 2128 to allow the piston ring 2139 to move radially between an expanded position and a compression position. The expanded position is defined as the piston ring 2139 being spaced from the housing 2034. The compressed position is defined as the piston ring 2139 being in engagement with the housing 2034 to align the additional piston 2100 with the housing 2034. The piston ring 2139 has an interior surface 2144 and an exterior surface 2145 with the interior surface 2144 being flat and the exterior surface 2145 being tapered toward the housing 2034 to form a contacting surface 2146. In the expanded position, the contacting surface 2146 may be disposed radially outward from the additional piston 2100 to allow the piston ring 2139 to engaging the housing 2034. In this way, piston ring 2139 may align the additional piston 2100 with the housing 2034 during the compression stroke and during the rebound stroke. Because the piston ring 2139 is not axially moveable, high pressure influence may be limited on the interior surface 2144 and noise caused by movement of the piston ring 2139 may be reduced. It should be appreciated that there may be no limitation to the number of discs for each of the pair of valve stacks 2112, 2114. The number of discs may not affect the axial clearance of the piston ring 2139.

Figure 10:
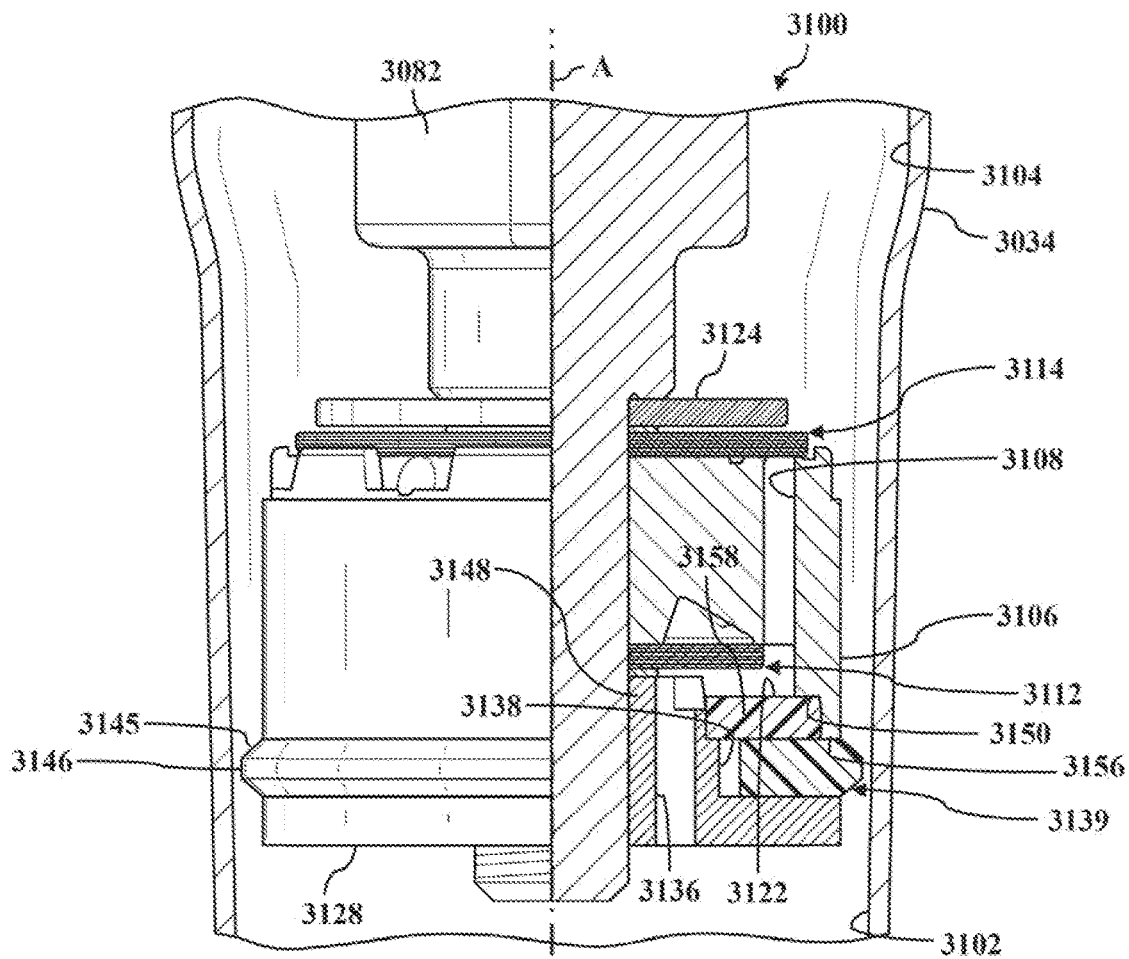
FIG. 10 is a fragmentary cross-sectional view of the hydraulic compression stop in accordance with another embodiment the present invention.
Figure 11:
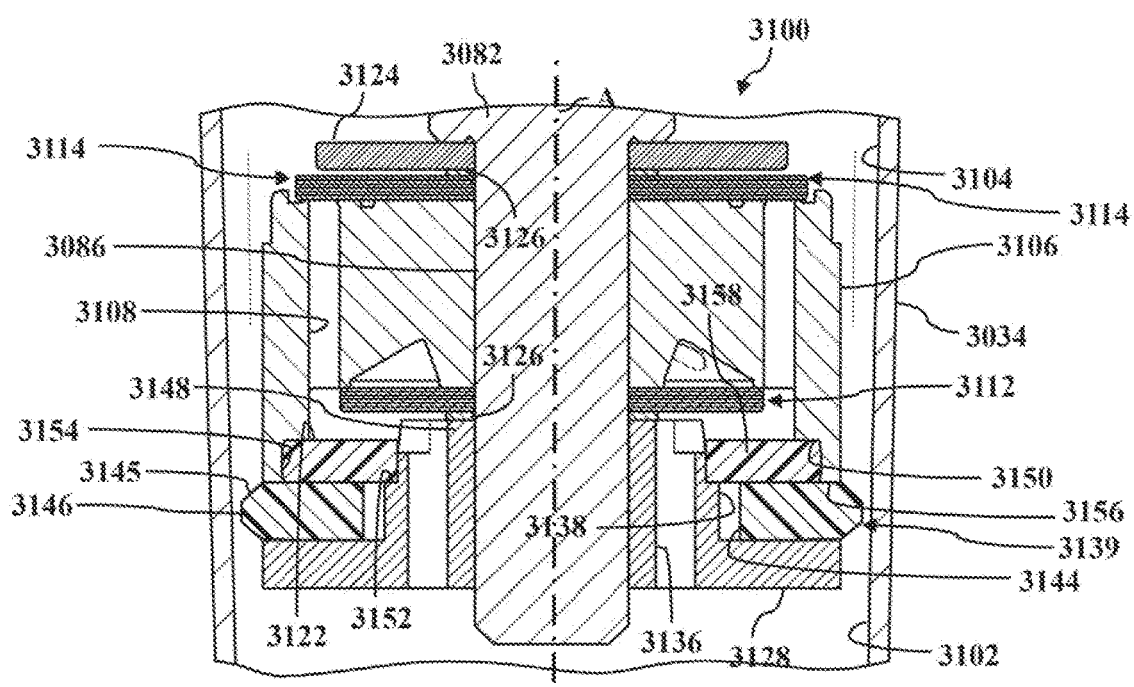
FIG. 11 is a cross-sectional view of the hydraulic compression stop in accordance with another embodiment the present invention.
Figure 12:
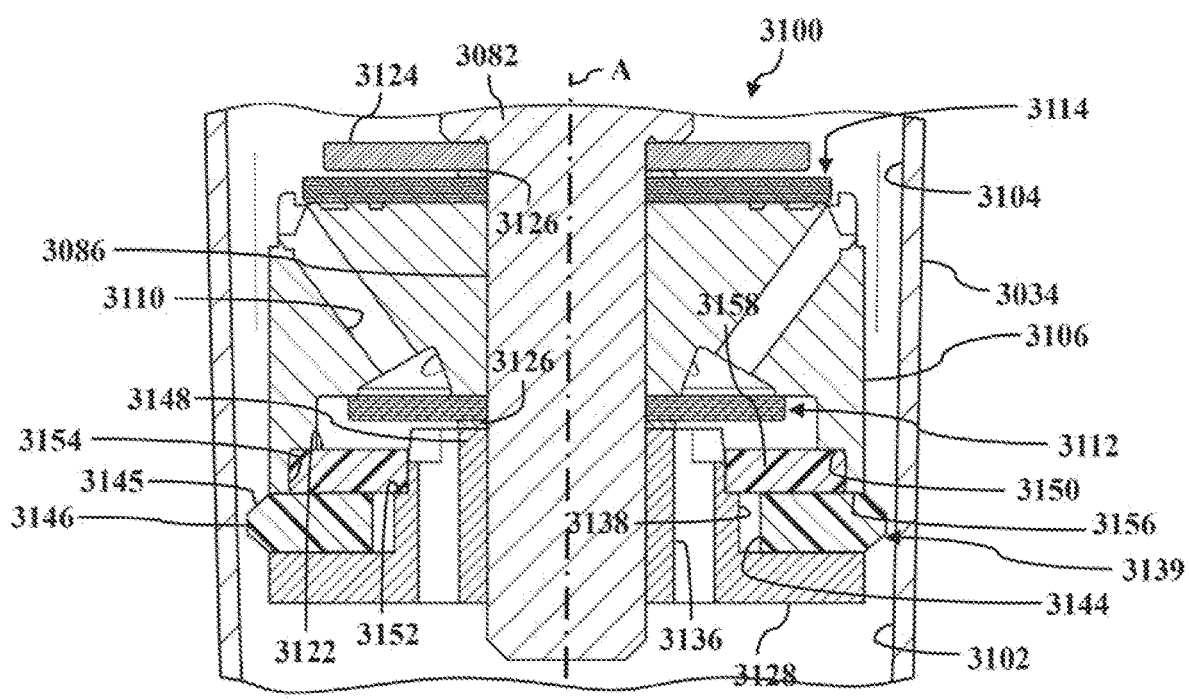
FIG. 12 is a cross-sectional view of the hydraulic compression stop in accordance with another embodiment the present invention.

According to an embodiment of the present invention as generally shown in FIGS. 10-12, the additional piston 3100 includes a main body 3106, having a generally cylindrical shape, extending about the center axis A. The main body 3106 defines a compression channel 3108 and a rebound channel 3110 for allowing fluid to flow through the additional piston 3100 during the compression stroke and the rebound stroke, respectively. A pair of valve stacks 3112, 3114, each having a generally cylindrical shape, are disposed on the center axis A and spaced apart from one another by the main body 3106. The pair of valve stacks 3112, 3114 includes a first valve stack 3112 and a second valve stack 3114, with the first valve stack 3112 engaging the main body 3106 of the additional piston 3100 and selectively covering the rebound channel 3110 to control fluid flow through the rebound channel 3110. The additional piston 3100 defines a cavity 3122 extending into the main body 3106 about the center axis A for housing the first valve stack 3112. The second valve stack 3114 engages the main body 3106 of the additional piston 3100 and selectively covers the compression channel 3108 to control fluid flow through the compression channel 3108.

A compression retainer 3124, having an annular shape, is disposed on the center axis A adjacent the second valve stack 3114 to limit deflection of the second valve stack 3114. A pair of spacers 3126, each having an annular shape, includes one spacer 3126 disposed adjacent the first valve stack 3112 and another spacer 3126 sandwiched between the second valve stack 3114 and the compression retainer 3124. A securing member 3128, having an annular shape and coupled to the piston rod extender 3082 of the piston rod 66 for securing the additional piston 3100 to the piston rod extender 3082 of the piston rod 66, and the piston rod extender 3082 sandwich the main body 3106, the pair of valve stacks 3112, 3114, and the compression retainer 3124 together. The securing member 3128 may be a nut that threadedly engages the threaded projection 3086 of the piston rod extender 3082. It should be appreciated that the terminal end of the piston rod extender 3082 may be a rod tenon.

The securing member 3128 defines a plurality of perforations 3136 spaced circumferentially about the center axis A extending between the compression chamber 3102 and the cavity 3122 to provide fluid communication between the compression chamber 3102 and the cavity 3122.

The securing member 3128 defines an outer groove 3138 extending radially inwardly toward the center axis A for receiving a piston ring 3139. In some embodiments, the outer groove 3138 is defined on an outer surface of the nut for receiving the piston ring 3139. The piston ring 3139 is located in the outer groove 3138 and is radially spaced from the securing member 3128 to allow the piston ring 3139 to move radially between an expanded position and a compression position. The expanded position is defined as the piston ring 3139 being spaced from the housing 3034. The compressed position is defined as the piston ring 3139 being in engagement with the housing 3034 to align the additional piston 3100 with the housing 3034. The piston ring 3139 has an interior surface 3144 and an exterior surface 3145 with the interior surface 3144 being flat and the exterior surface 3145 being tapered toward the housing 3034 to form a contacting surface 3146. In the expanded position, the contacting surface 3146 may be disposed radially outward from the additional piston 3100 to allow the piston ring 3139 to engaging the housing 3034. In this way, piston ring 3139 may align the additional piston 3100 with the housing 3034 during a compression stroke and a rebound stroke. Because the piston ring 3139 is not axially moveable, high pressure influence may be limited on the interior surface 3144 and noise caused by movement of the ring may be reduced. It should be appreciated that the compression retainer 3124 may be tuned based on the number of discs in each of the pair of valve stacks 3112, 3114 because the number of discs may affect the axial clearance of the piston ring 3139.

The securing member 3128 includes an extension member 3148 extending along the center axis A toward the main body 3106 to sandwich one of the pair of spacers 3126 between the first valve stack 3112 and the extension member 3148. The additional piston 3100 includes a first ledge 3150 extending radially inwardly from the main body 3106 toward the cavity 3122. A second ledge 3152, axially spaced from the first ledge 3150 and spaced radially inwardly from the first ledge 3150, extends radially outwardly from the securing member 3128 toward the main body 3106. The first ledge 3150 and the second ledge 3152 define an inner groove 3154 extending between the securing member 3128 and the main body 3106. The main body 3106 includes a lip 3156, having an annular shape, extending from a periphery of the main body 3106 along the center axis A. A sealing member 3158, having a discoidal shape, is disposed in the inner groove 3154, sandwiched between the first ledge 3150 and the second ledge 3152 and engaging the lip 3156. The sealing member 3158 has an outer surface facing the compression chamber 3102 that may be flush with the lip 3156. The lip 3156 and the sealing member 3158 provide for sealing the cavity 3122 from the compression chamber 3102.

Figure 13:
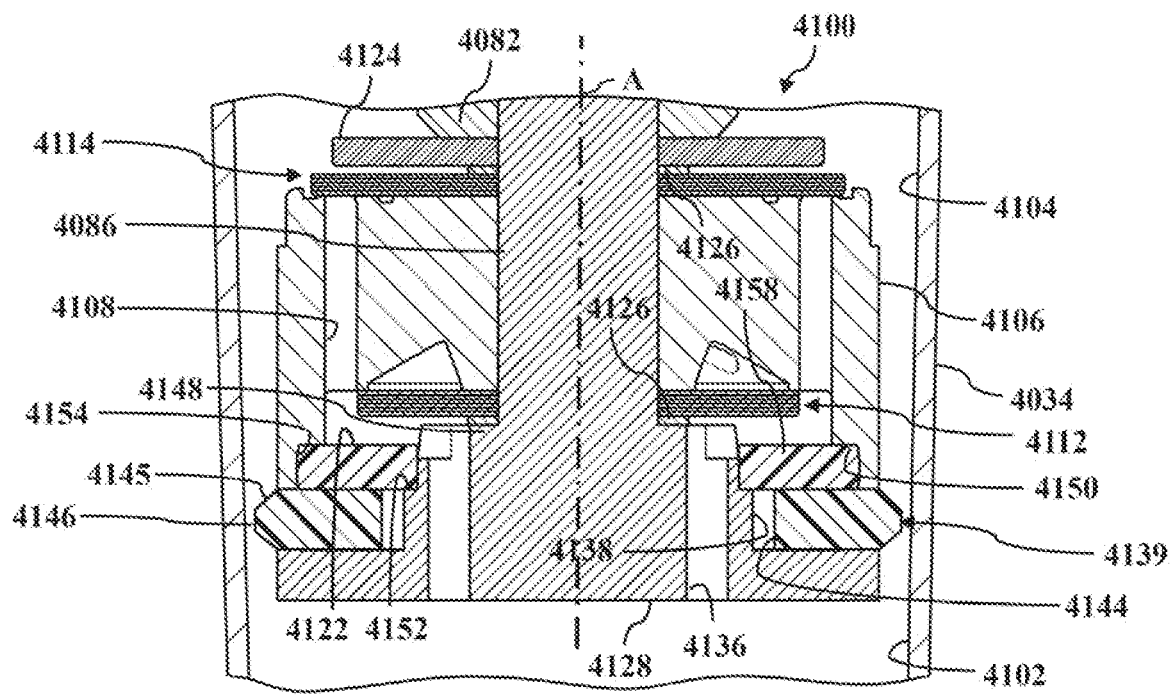
FIG. 13 is a cross-sectional view of the hydraulic compression stop in accordance with another embodiment the present invention.
Figure 14:
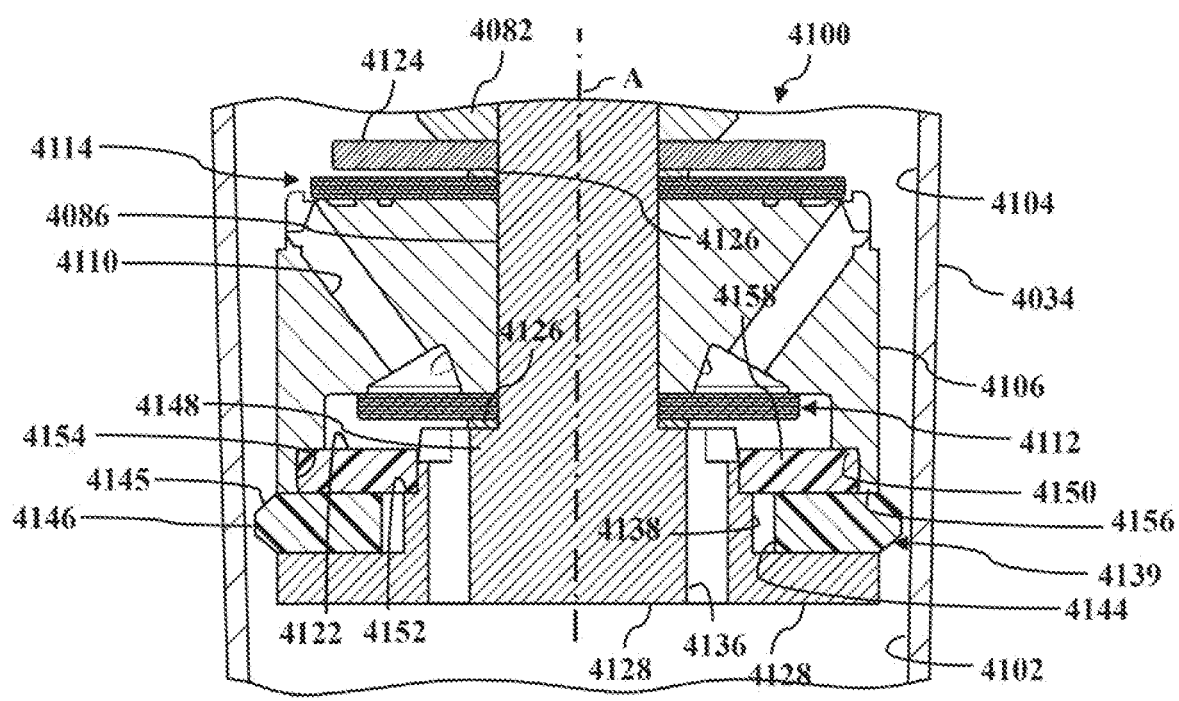
FIG. 14 is a cross-sectional view of the hydraulic compression stop in accordance with another embodiment the present invention.

According to an embodiment of the present invention as generally shown in FIGS. 13-14, the additional piston 4100 includes a main body 4106, having a generally cylindrical shape, extending about the center axis A. The main body 4106 defines a compression channel 4108 and a rebound channel 4110 for allowing fluid to flow through the additional piston 4100 during the compression stroke and the rebound stroke, respectively. A pair of valve stacks 4112, 4114, each having a generally cylindrical shape, are disposed on the center axis A and spaced apart from one another by the main body 4106. The pair of valve stacks 4112, 4114 includes a first valve stack 4112 and a second valve stack 4114, with the first valve stack 4112 engaging the main body 4106 of the additional piston 4100 and selectively covering the rebound channel 4110 to control fluid flow through the rebound channel 4110. The second valve stack 4114 engages the main body 4106 of the additional piston 4100 and selectively covers the compression channel 4108 to control fluid flow through the compression channel 4108.

The additional piston 4100 includes a main body 4106, having a generally cylindrical shape, extending about the center axis A. The main body 4106 defines a compression channel 4108 for allowing fluid to flow through the additional piston 4100 during the compression stroke and a rebound channel 4110 for allowing fluid to flow through the additional piston 4100 during the rebound stroke. A pair of valve stacks 4112, 4114, each having a generally cylindrical shape, are disposed on the center axis A and spaced apart from one another by the main body 4106. The pair of valve stacks 4112, 4114 includes a first valve stack 4112 and a second valve stack 4114, with the first valve stack 4112 engaging the main body 4106 of the additional piston 4100 and selectively covering the rebound channel 4110 to control fluid flow through the rebound channel 4110. The additional piston 4100 defines a cavity 4122 extending into the main body 4106 about the center axis A for housing the first valve stack 4112. The second valve stack 4114 engages the main body 4106 of the additional piston 4100 and selectively covers the compression channel 4108 to control fluid flow through the compression channel 4108.

A compression retainer 4124, having an annular shape, is disposed on the center axis A adjacent the second valve stack 4114 to limit deflection of the second valve stack 4114. A pair of spacers 4126, each having an annular shape, includes one spacer 4126 disposed adjacent the first valve stack 4112 and another spacer 4126 sandwiched between the second valve stack 4114 and the compression retainer 4124. A securing member 4128, having an annular shape and coupled to the piston rod extender 4082 of the piston rod 66 for securing the additional piston 4100 to the piston rod extender 4082 of the piston rod 66, and the piston rod extender 4082, sandwich the main body 4106, the pair of valve stacks 4112, 4114, and the compression retainer 4124 together. The securing member 4128 may be a bolt having a stem portion that forms the threaded projection 4086. It should be appreciated that the terminal end of the piston rod extender 4082 may be a rod tenon.

The securing member 4128 defines a plurality of perforations 4136 spaced circumferentially about the center axis A extending between the compression chamber 4102 and cavity 4122 to provide fluid communication between the compression chamber 4102 and the cavity 4122.

The securing member 4128 defines an outer groove 4138 extending radially inwardly toward the center axis A for receiving a piston ring 4139. In some embodiments, the outer groove 4138 is defined on an outer surface of the bolt for receiving the piston ring 4139. The piston ring 4139 is located in the outer groove 4138 and is radially spaced from the securing member 4128 to allow the piston ring 4139 to move radially between an expanded position and a compression position. The expanded position is defined as the piston ring 4139 being spaced from the housing 4034. The compressed position is defined as the piston ring 4139 being in engagement with the housing 4034 to align the additional piston 4100 with the housing 4034. The piston ring 4139 has an interior surface 4144 and an exterior surface 4145 with the interior surface 4144 being flat and the exterior surface 4145 being tapered toward the housing 4034 to form a contacting surface 4146. In the expanded position, the contacting surface 4146 may be disposed radially outward from the additional piston 4100 to allow the piston ring 4139 to engaging the housing 4034. In this way, piston ring 4139 may align the additional piston 4100 with the housing 4034 during a compression stroke and a rebound stroke. Because the piston ring 4139 may not be axially moveable, high pressure influence may be limited on the interior surface 4144, and noise caused by movement of the piston ring 4139 may be reduced. It should be appreciated that the compression retainer 4124 may be tuned based on the number of discs in the first valve stacks 4112, because the number of discs may affect the axial clearance of the piston ring 4139.

The securing member 4128 includes an extension member 4148 extending along the center axis A toward the main body 4106 to sandwich one of the pair of spacers 4126 between the first valve stack 4112 and the extension member 4148. The additional piston 4100 includes a first ledge 4150 extending radially inwardly from the main body 4106 toward the cavity 4122. A second ledge 4152, axially spaced from the first ledge 4150 and spaced radially inwardly from the first ledge 4150, extends radially outwardly from the securing member 4128 toward the main body 4106. The first ledge 4150 and the second ledge 4152 define an inner groove 4154 extending between the securing member 4128 and the main body 4106. The main body 4106 includes a lip 4156, having an annular shape, extending from a periphery of the main body 4106 along the center axis A. A sealing member 4158, having a discoidal shape, is disposed in the inner groove 4154, sandwiched between the first ledge 4150 and the second ledge 4152 and engaging the lip 4156. The sealing member 4158 has an outer surface facing the compression chamber 4102 that may be flush with the lip 4156. The lip 4156 and the sealing member 4158 provide for sealing the cavity 4122 from the compression chamber 4102.

Figure 15:
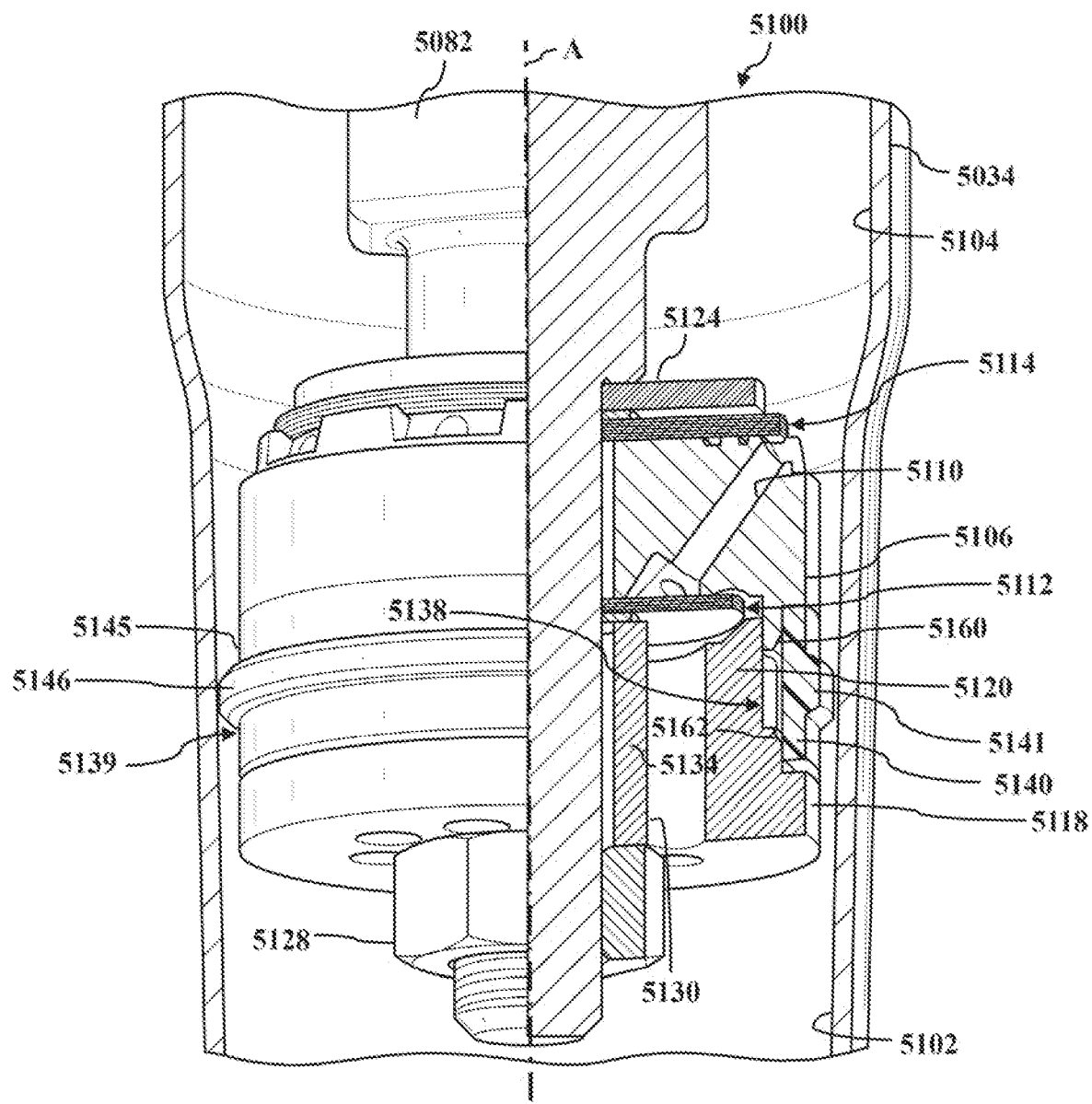
FIG. 15 is a fragmentary cross-sectional view of the hydraulic compression stop in accordance with another embodiment the present invention.
Figure 16:
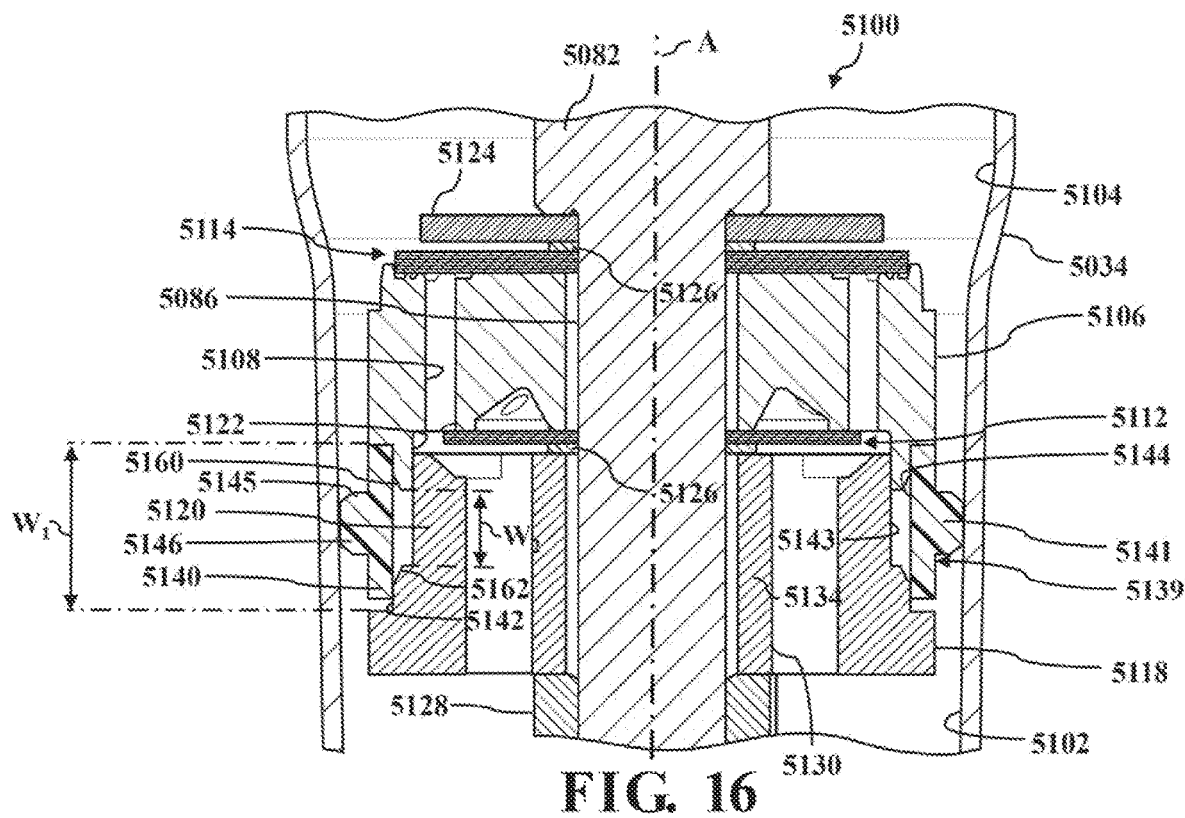
FIG. 16 is a cross-sectional view of the hydraulic compression stop in accordance with another embodiment the present invention.
Figure 17:
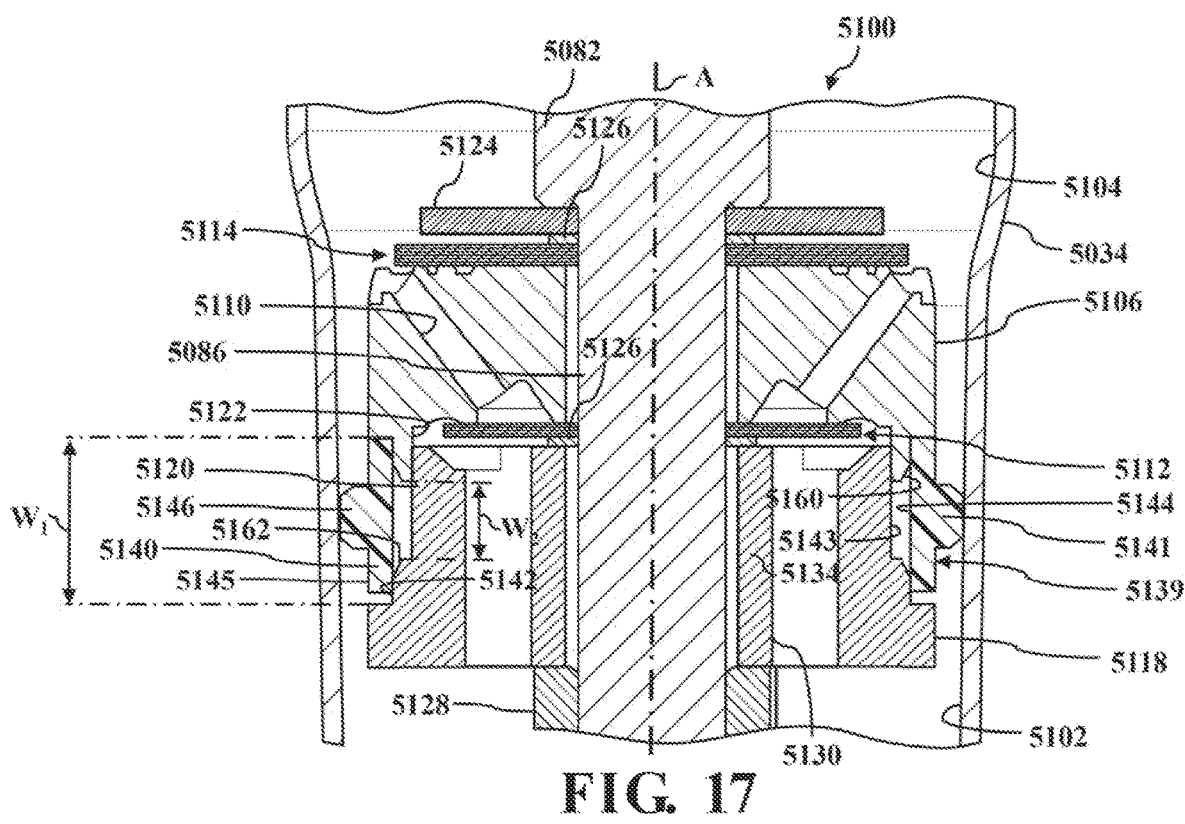
FIG. 17 is a cross-sectional view of the hydraulic compression stop in accordance with an embodiment the present invention.

According to an embodiment of the present invention as generally shown in FIGS. 15-17, the additional piston 5100 includes a main body 5106, having a generally cylindrical shape, extending about the center axis A. The main body 5106 defines a compression channel 5108 and a rebound channel 5110 for allowing fluid to flow through the additional piston 5100 during the compression stroke and the rebound stroke, respectively. A pair of valve stacks 5112, 5114, each having a generally cylindrical shape, are disposed on the center axis A and spaced apart from one another by the main body 5106. The pair of valve stacks 5112, 5114 includes a first valve stack 5112 and a second valve stack 5114, with the first valve stack 5112 engaging the main body 5106 of the additional piston 5100 and selectively covering the rebound channel 5110 to control fluid flow through the rebound channel 5110. The second valve stack 5114 engages the main body 5106 of the additional piston 5100 and selectively covers the compression channel 5108 to control fluid flow through the compression channel 5108. A rebound retainer 5118, having a cylindrical shape, is disposed on the center axis A and extends toward the first valve stack 5112 to limit deflection of the first valve stack 5112. The rebound retainer 5118 includes a collar 5120 extending along the center axis A from a periphery of the rebound retainer 5118 to engage the main body 5106 and define a cavity 5122 extending between the rebound retainer 5118 and the main body 5106 for housing the working fluid.

A compression retainer 5124, having an annular shape, is disposed on the center axis A adjacent the second valve stack 5114 to limit deflection of the second valve stack 5114. A pair of spacers 5126, each having an annular shape, includes one spacer 5126 disposed adjacent the first valve stack 5112 and another spacer 5126 sandwiched between the second valve stack 5114 and the compression retainer 5124. A securing member 5128, having an annular shape and coupled to the piston rod extender 5082 of the piston rod 66 for securing the additional piston 5100 to the piston rod extender 5082 of the piston rod 66, and the piston rod extender 5082 sandwich the rebound retainer 5118, the main body 5106, and the compression retainer 5124 together. The securing member 5128 may be a nut that threadedly engages the threaded projection 5086 of the piston rod extender 5082. It should be appreciated that the terminal end of the piston rod extender 5082 may be a rod tenon.

The rebound retainer 5118 defines a plurality of passages 5130 spaced circumferentially about the center axis A in fluid communication with the rebound channel 5110 and the compression channel 5108 to provide fluid communication between the compression chamber 5102 and the cavity 5122. A protrusion 5134 disposed radially inwardly from the collar 5120 adjacent the threaded projection 5086 extends along the center axis A from the rebound retainer 5118 to sandwich one of the pair of spacers 5126 with the first valve stack 5112.

The main body 5106 and the rebound retainer 5118 engage one another to define an outer groove 5138 extending radially inwardly toward the center axis A for receiving a piston ring 5139. The piston ring 5139 is located in the outer groove 5138 and includes a sleeve portion 5140 and a middle portion 5141, with the middle portion 5141 extending radially outwardly from the sleeve portion 5140 for engaging the housing 5034. The outer groove 5138 is a stepped groove including a first groove 5142 having a first width $W_1$ and a second groove 5143 having a second width $W_2$. The first width $W_1$ is greater than the second width $W_2$ to prevent the sleeve portion 5140 from flexing radially inwardly. The second groove 5143 is disposed radially inwardly from the first groove 5142 to allow the middle portion 5141 of the piston ring 5139 to flex radially inwardly. The first groove 5142 is defined by both the main body 5106 and the rebound retainer 5118. The piston ring 5139 is radially spaced from the rebound retainer 5118 to allow the piston ring 5139 to move radially between an expanded position and a compression position. The expanded position is defined as the piston ring 5139 being spaced from the housing 5034. The compressed position is defined as the piston ring 5139 being in engagement with the housing 5034 to align the additional piston 5100 with the housing 5034. The piston ring 5139 has an interior surface 5144 and an exterior surface 5145 with the interior surface 5144 being flat and the exterior surface 5145 being tapered toward the housing 5034 to form a contacting surface 5146. In the expanded position, the contacting surface 5146 may be disposed radially outward from the additional piston 5100 to allow the piston ring 5139 to engage the housing 5034. In this way, the piston ring 5139 may align the additional piston 5100 with the housing 5034 during a compression stroke and a rebound stroke. Because the piston ring 5139 may not be axially moveable, high pressure influence may be limited on the interior surface 5144 and noise caused by movement of the piston ring 5139 may be reduced. It should be appreciated that the number of discs for each of the pair of valve stacks 5112, 5114 may affect the axial clearance of the piston ring 5139, while allowing the piston ring 5139 to maintain its tightness on the main body 5106 and the rebound retainer 5118.

At least one ridge 5160, 5162 extends between the first groove 5142 and the second groove 5143. The at least one ridge 5160, 5162 tapers radially inwardly from the first groove 5142 toward the second groove 5143 to prevent the piston ring 5139 from wear along the at least one ridge 5160, 5162. The at least one ridge 5160, 5162 includes a first ridge 5160 disposed on the main body 5106 and a second ridge 5162 disposed on the retainer. The first ridge 5160 and the second ridge 5162 each taper radially inwardly toward one another toward the second groove 5143.

Figure 18:
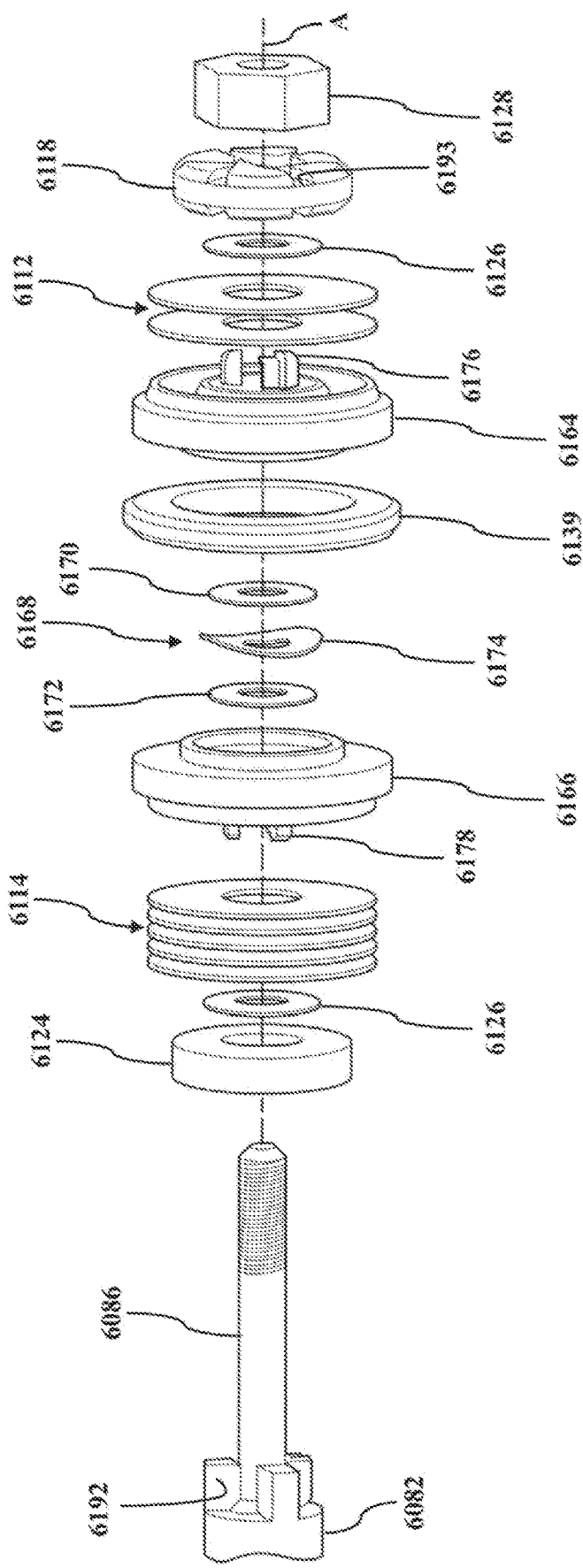
FIG. 18 is an exploded view of the hydraulic compression stop in accordance with another embodiment the present invention.
Figure 19:
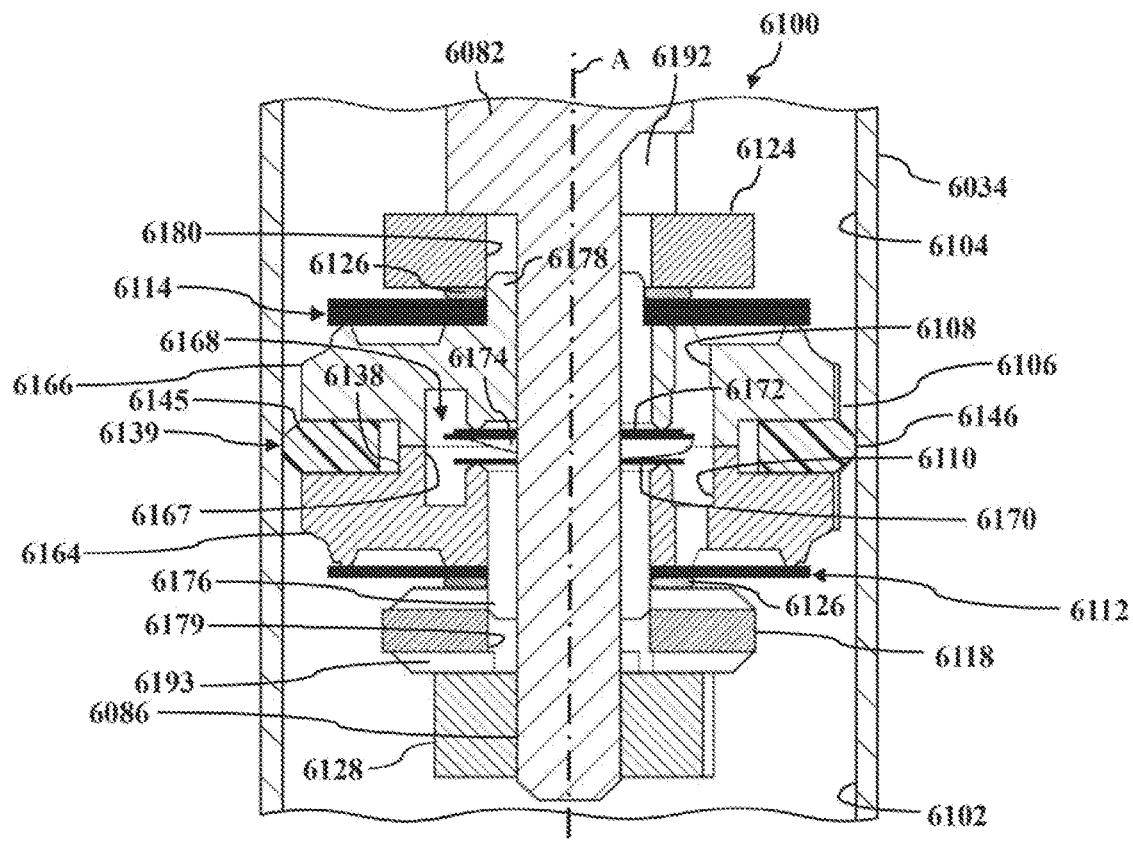
FIG. 19 is a cross-sectional view of the hydraulic compression stop in accordance with another embodiment the present invention.
Figure 20:
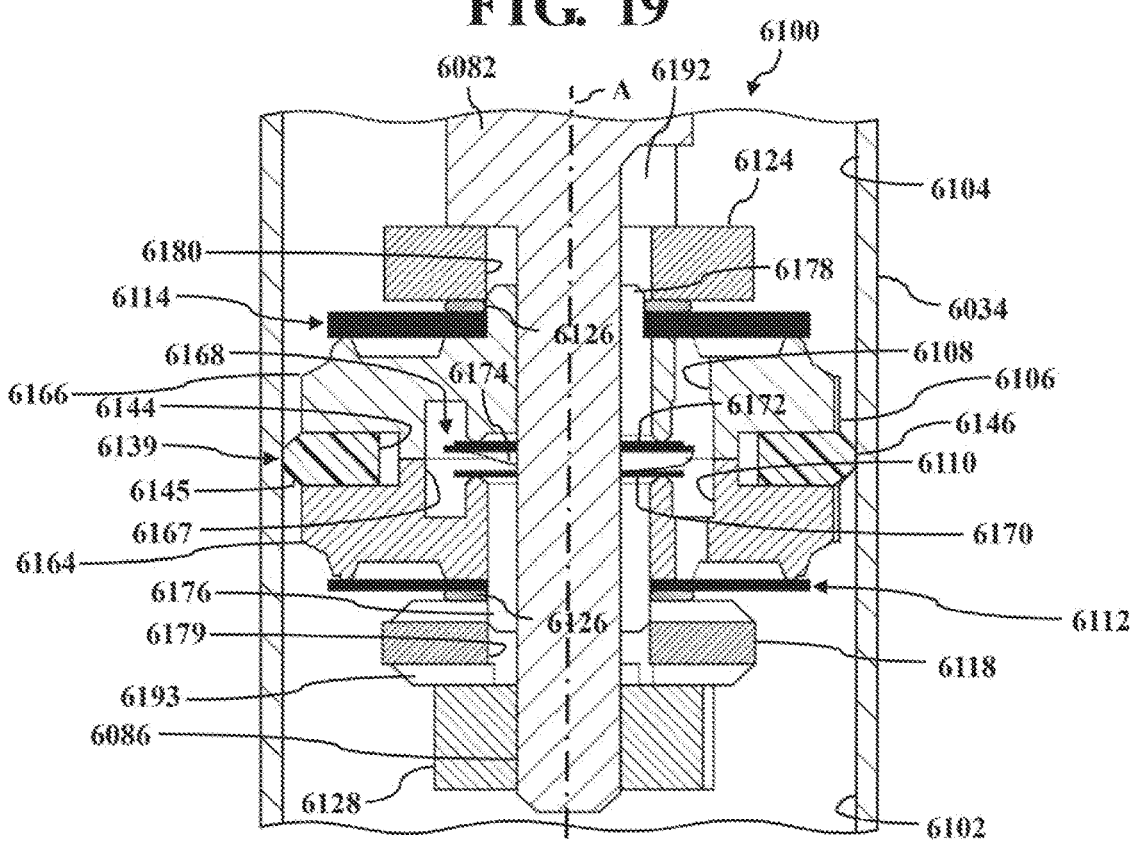
FIG. 20 is a cross-sectional view of the hydraulic compression stop in accordance with another embodiment the present invention.

According to an embodiment of the present invention as generally shown in FIGS. 18-20, the additional piston 6100 includes a main body 6106, having a generally cylindrical shape, extending about the center axis A. The main body 6106 defines a compression channel 6108 and a rebound channel 6110 for allowing fluid to flow through the additional piston 6100 during the compression stroke and the rebound stroke, respectively. A pair of valve stacks 6112, 6114, each having a generally cylindrical shape, are disposed on the center axis A and spaced apart from one another by the main body 6106. The pair of valve stacks 6112, 6114 includes a first valve stack 6112 and a second valve stack 6114, with the first valve stack 6112 engaging the main body 6106 of the additional piston 6100 and selectively covering the rebound channel 6110 to control fluid flow through the rebound channel 6110. The second valve stack 6114 engages the main body 6106 of the additional piston 6100 and selectively covers the compression channel 6108 to control fluid flow through the compression channel 6108. A rebound retainer 6118, having a discoidal shape, is disposed on the center axis A and extends toward the first valve stack 6112 to limit deflection of the first valve stack 6112.

A compression retainer 6124, having a discoidal shape, is disposed on the center axis A adjacent the second valve stack 6114 to limit deflection of the second valve stack 6114. The rebound retainer 6118 and the compression retainer 6124 are spaced from one another by the main body 6106. A pair of spacers 6126, each having an annular shape, includes one spacer 6126 disposed adjacent the first valve stack 6112 and another spacer 6126 sandwiched between the second valve stack 6114 and the compression retainer 6124. A securing member 6128, having an annular shape and coupled to the piston rod extender 6082 of the piston rod 66 for securing the additional piston 6100 to the piston rod extender 6082 of the piston rod 66, and the piston rod extender 6082, sandwich the rebound retainer 6118, the main body 6106, and the compression retainer 6124 together. The securing member 6128 may be a nut that threadedly engages the threaded projection 6086 of the piston rod extender 6082. It should be appreciated that the terminal end of the piston rod extender 6082 may be a rod tenon.

The main body 6106 defines an outer groove 6138 extending radially inwardly toward the center axis A for receiving a piston ring 6139. The piston ring 6139 is located in the outer groove 6138 and is radially spaced from the main body 6106 to allow the piston ring 6139 to move radially between an expanded position with the piston ring 6139 spaced from the housing 6034 and a compressed position with the piston ring 6139 engaging the housing 6034. The piston ring 6139 has an interior surface 6144 and an exterior surface 6145 with the interior surface 6144 being flat and the exterior surface 6145 being tapered toward the housing 6034 to form a contacting surface 6146. In the expanded position, the contacting surface 6146 may be disposed radially outward from the additional piston 6100 to allow the piston ring 6139 to engaging the housing 6034. In this way, piston ring 6139 may align the additional piston 6100 with the housing 6034 during a compression stroke and a rebound stroke. Because the piston ring 6139 may not be axially moveable, high pressure influence may be limited on the interior surface 6144 and noise caused by movement of the piston ring 6139 may be reduced. It should be appreciated that there may be no limitation to the number of discs for each of the pair of valve stacks 6112, 6114 because the number of discs does not affect the axial clearance of the piston ring 6139.

The additional piston 6100 includes a bottom portion 6164 and a top portion 6166, each having a cylindrical shape and disposed on the center axis A, engaging one another to establish the main body 6106 and the outer groove 6138 between the top portion 6166 and the bottom portion 6164. The main body 6106 defines a hollow 6167 extending between the top portion 6166 and the bottom portion 6164 about the center axis A. A valve assembly 6168 is disposed in the hollow 6167 and extends between the bottom portion 6164 and the top portion 6166 for controlling flow through the additional piston 6100. The valve assembly 6168 includes a compression disc 6170 engaging the bottom portion 6164 to control fluid flow through the compression channel 6108 and a rebound disc 6172 engaging the top portion 6166 to control fluid flow through the rebound channel 6110. The compression disc 6170 and the rebound disc 6172 are biased against one another and biased against the main body 6106 via a spring disc 6174 extending between the compression disc 6170 and the rebound disc 6172. In this way, the compression disc 6170 is biased to seal off the hollow 6167 from the fluid chamber 40, 42. In some embodiments, the top portion 6166 and the bottom portion 6164 may be structurally identical.

The additional piston 6100 includes a plurality of fingers 6176, 6178 spaced from one another about the center axis A and extending outwardly from the main body 6106 and adjacent the piston rod 66. The plurality of fingers 6176, 6178 includes a plurality of first fingers 6176 and a plurality of second fingers 6178, with the plurality of first fingers 6176 extending outwardly from the bottom portion 6164 and the plurality of second fingers 6178 extending outwardly from the top portion 6166. At least one of the rebound retainer 6118 and the compression retainer 6124 defines a central hole 6179, 6180 extending along the center axis A for receiving the plurality of fingers 6176, 6178. In particular, the rebound retainer 6118 may define a first central hole 6179 and the compression retainer 6124 may define a second central hole 6180. Each central hole 6179, 6180 has a diameter greater than a diameter of a portion of the piston rod extender 6082 to allow the plurality of first fingers 6176 to engage the first central hole 6179 and to allow the plurality of second fingers 6178 to engage the second central hole 6180. In other words, the rebound retainer 6118 is configured to receive the plurality of first fingers 6176 and the compression retainer 6124 is configured to receive the plurality of second fingers 6178. The central hole 6179, 6180 is in fluid communication with of one of the rebound channel 6110 and the compression channel 6108. The first central hole 6179 may be in fluid communication with one of the compression channel 6108 and the rebound channel 6110, and the second central hole 6180 may be in fluid communication with another of the compression channel 6108 and the rebound channel 6110. In particular, the first central hole 6179 may be in fluid communication with the compression channel 6108, and the second central hole 6180 may be in fluid communication with the rebound channel 6110. The spacing between the plurality of fingers allows fluid communication between the fluid chamber 40, 42 and the hollow 6167.

The rod tenon defines at least one bore 6192 extending radially inwardly from the fluid chamber 40, 42 to provide fluid communication between the rebound channel 6110 and the fluid chamber 40, 42. The rebound retainer 6118 defines a plurality of recesses 6193 extending radially outwardly between the fluid chamber 40, 42 and the central hole 6179, 6180 to allow fluid communication between the fluid chamber 40, 42 and one of the compression channel 6108 and the rebound channel 6110. In particular, the plurality of recesses 6193 is configured to provide fluid communication between the fluid chamber 40, 42 and the compression channel 6108.

Figure 21:
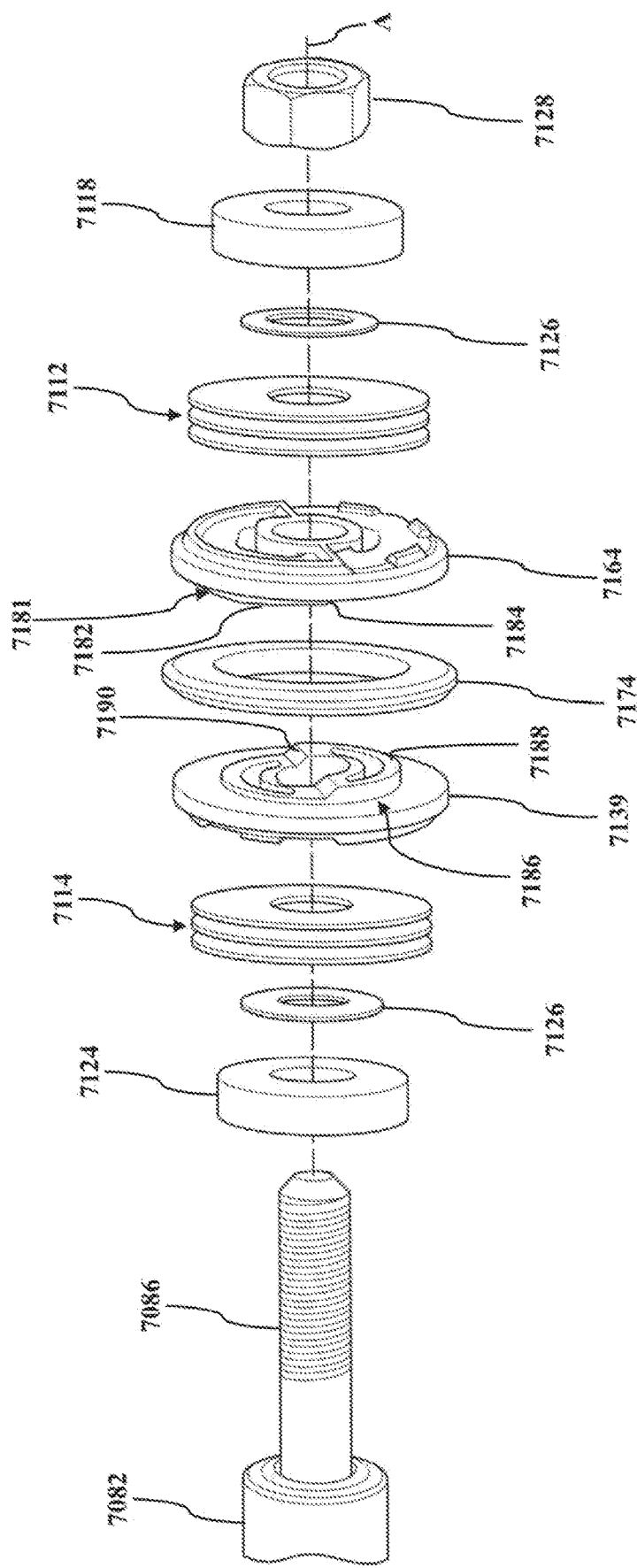
FIG. 21 is an exploded view of the hydraulic compression stop in accordance with another embodiment the present invention.
Figure 22:
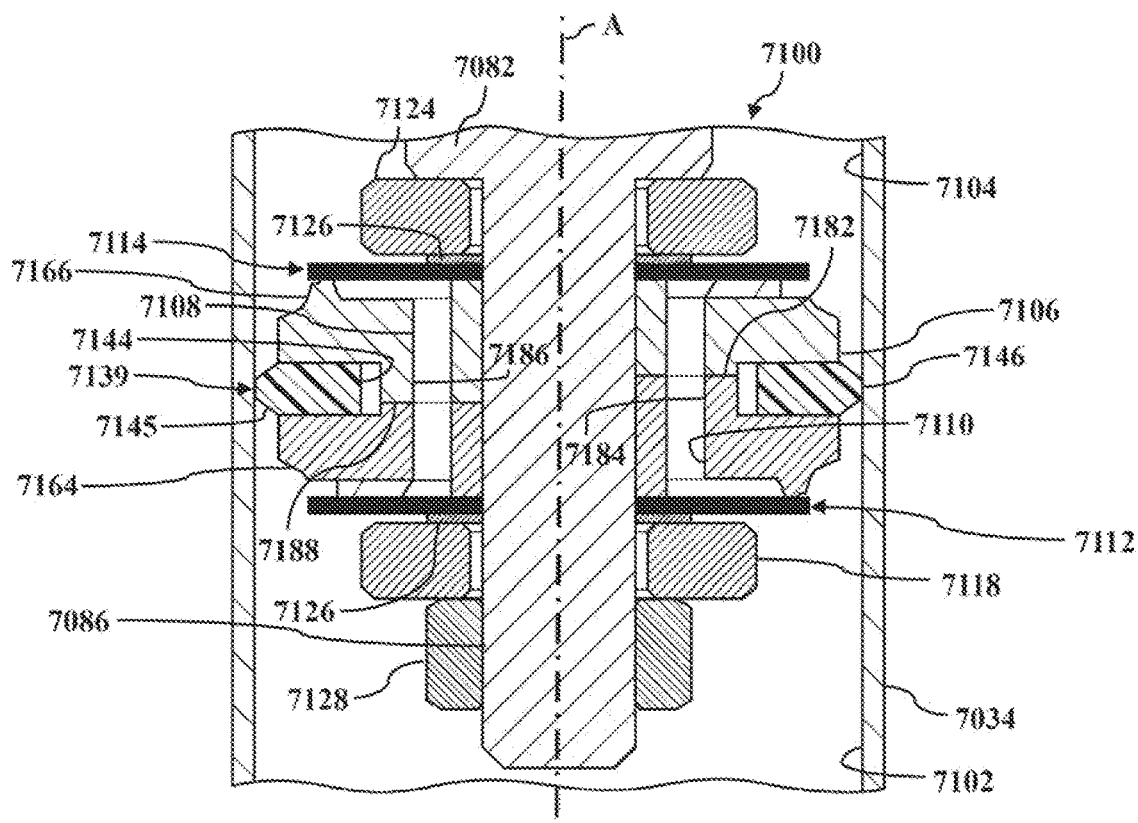
FIG. 22 is a cross-sectional view of the hydraulic compression stop in accordance with another embodiment the present invention.
Figure 23:
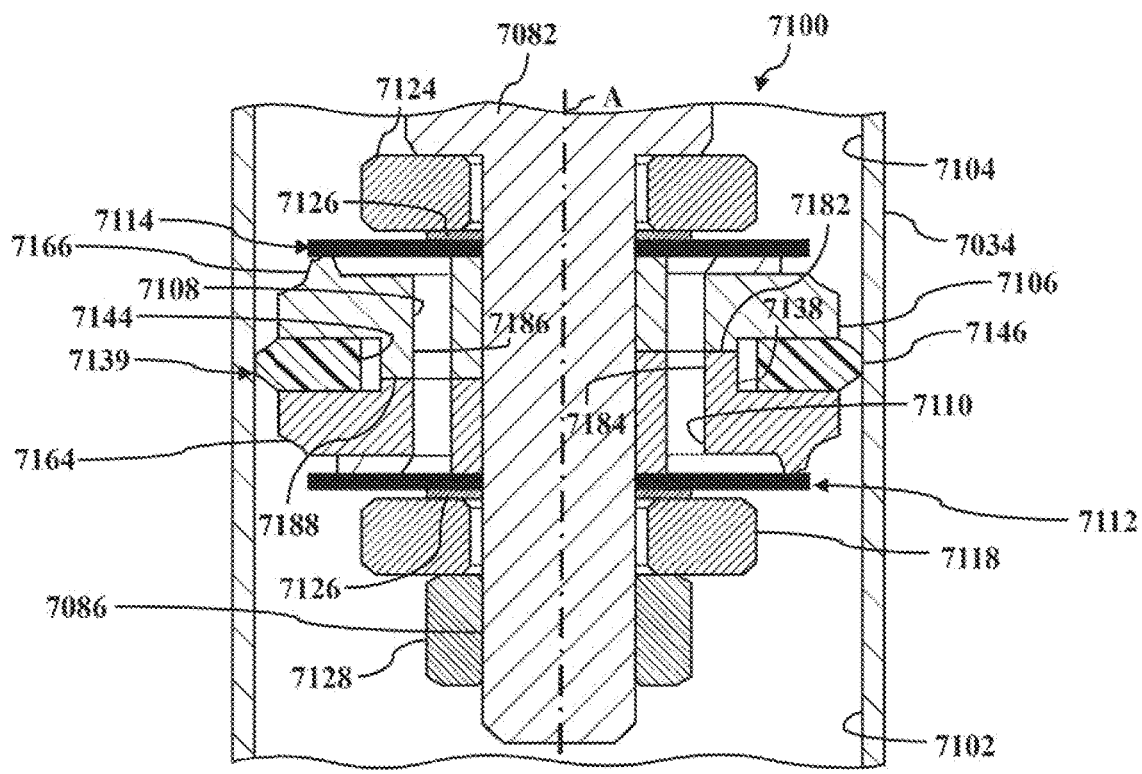
FIG. 23 is a cross-sectional view of the hydraulic compression stop in accordance with another embodiment the present invention.

According to an embodiment of the present invention as generally shown in FIGS. 21-23, the additional piston 7100 includes a main body 7106, having a generally cylindrical shape, extending about the center axis A. The main body 7106 defines a compression channel 7108 and a rebound channel 7110 for allowing fluid to flow through the additional piston 7100 during the compression stroke and the rebound stroke, respectively. A pair of valve stacks 7112, 7114, each having a generally cylindrical shape, are disposed on the center axis A and spaced apart from one another by the main body 7106. The pair of valve stacks 7112, 7114 includes a first valve stack 7112 and a second valve stack 7114, with the first valve stack 7112 engaging the main body 7106 of the additional piston 7100 and selectively covering the rebound channel 7110 to control fluid flow through the rebound channel 7110. The second valve stack 7114 engages the main body 7106 of the additional piston 7100 and selectively covers the compression channel 7108 to control fluid flow through the compression channel 7108. A rebound retainer 7118, having a discoidal shape, is disposed on the center axis A and extends toward the first valve stack 7112 to limit deflection of the first valve stack 7112.

A compression retainer 7124, having a discoidal shape, is disposed on the center axis A adjacent the second valve stack 7114 to limit deflection of the second valve stack 7114. The rebound retainer 7118 and the compression retainer 7124 are spaced from one another by the main body 7106. A pair of spacers 7126, each having an annular shape, includes one spacer 7126 disposed adjacent the first valve stack 7112 and another spacer 7126 sandwiched between the second valve stack 7114 and the compression retainer 7124. A securing member 7128, having an annular shape and coupled to the piston rod extender 7082 of the piston rod 66 for securing the additional piston 7100 to the piston rod extender 7082 of the piston rod 66, and the piston rod extender 7082 sandwich the rebound retainer 7118, the main body 7106, and the compression retainer 7124 together. The securing member 7128 may be a nut that threadedly engages the threaded projection 7086 of the piston rod extender 7082. It should be appreciated that the terminal end of the piston rod extender 7082 may be a rod tenon.

The main body 7106 defines an outer groove 7138 extending radially inwardly toward the center axis A for receiving a piston ring 7139. The piston ring 7139 is located in the outer groove 7138 and is radially spaced from the securing member 7128 to allow the piston ring 7139 to move radially between an expanded position with the piston ring 7139 spaced from the housing 7034 and a compressed position with the piston ring 7139 engaging the housing 7034. The piston ring 7139 has an interior surface 7144 and an exterior surface 7145 with the interior surface 7144 being flat and the exterior surface 7145 being tapered toward the housing 7034 to form a contacting surface 7146. In the expanded position, the contacting surface 7146 may be disposed radially outward from the additional piston 7100 to allow the piston ring 7139 to engaging the housing 7034. In this way, piston ring 7139 may align the additional piston 7100 with the housing 7034 during a compression stroke and a rebound stroke. Because the piston ring 7139 may not be axially moveable, high pressure influence may be limited on the interior surface 7144 and noise caused by movement of the piston ring 7139 may be reduced. It should be appreciated that there may be no limitation to the number of discs for each of the pair of valve stacks 7112, 7114 because the number of discs may not affect the axial clearance of the piston ring 7139.

The additional piston 7100 includes a bottom portion 7164 and a top portion 7166, each having a cylindrical shape and disposed on the center axis A, configured to engage one another to establish the main body 7106, and forming the outer groove 7138 between the top portion 7166 and the bottom portion 7164. A bottom mating member 7181 extends outwardly from the bottom portion 7164 toward the top portion 7166. The bottom mating member 7181 has a first end face 7182 for engaging the top portion 7166 and a bottom mating surface 7184 extending between the bottom mating member 7181 and the first end face 7182. A top mating member 7186 extends outwardly from the top portion 7166 toward the bottom portion 7164. The top mating member 7186 has a second end face 7188 for engaging the bottom portion 7164 and a top mating surface 7190 extending between the top mating member 7186 and the second end face 7188. The bottom mating member 7181 and the top mating member 7186 are oriented opposite one another and engage one another along the bottom mating surface 7184 and the top mating surface 7190. The bottom mating member 7181 and the top mating member 7186 may each be semicircular in shape and oriented 180 degrees from one another. The bottom mating surface 7184 is tapered between the bottom portion 7164 and the first end face 7182, and the top mating surface 7190 is tapered between the top portion 7166 and the second end face 7188. Together, the bottom mating member 7181 and the top mating member 7186 form the outer groove 7138 for receiving the piston ring 7139. The bottom mating member 7181 defines a portion of one of the compression channel 7108 and the rebound channel 7110, and the top mating member 7186 defines a portion of the other of the compression channel 7108 and the rebound channel 7110. In particular, the top mating member 7186 defines a portion of the rebound channel 7110, and the bottom mating member 7181 defines a portion of the compression channel 7108.

Figure 24:
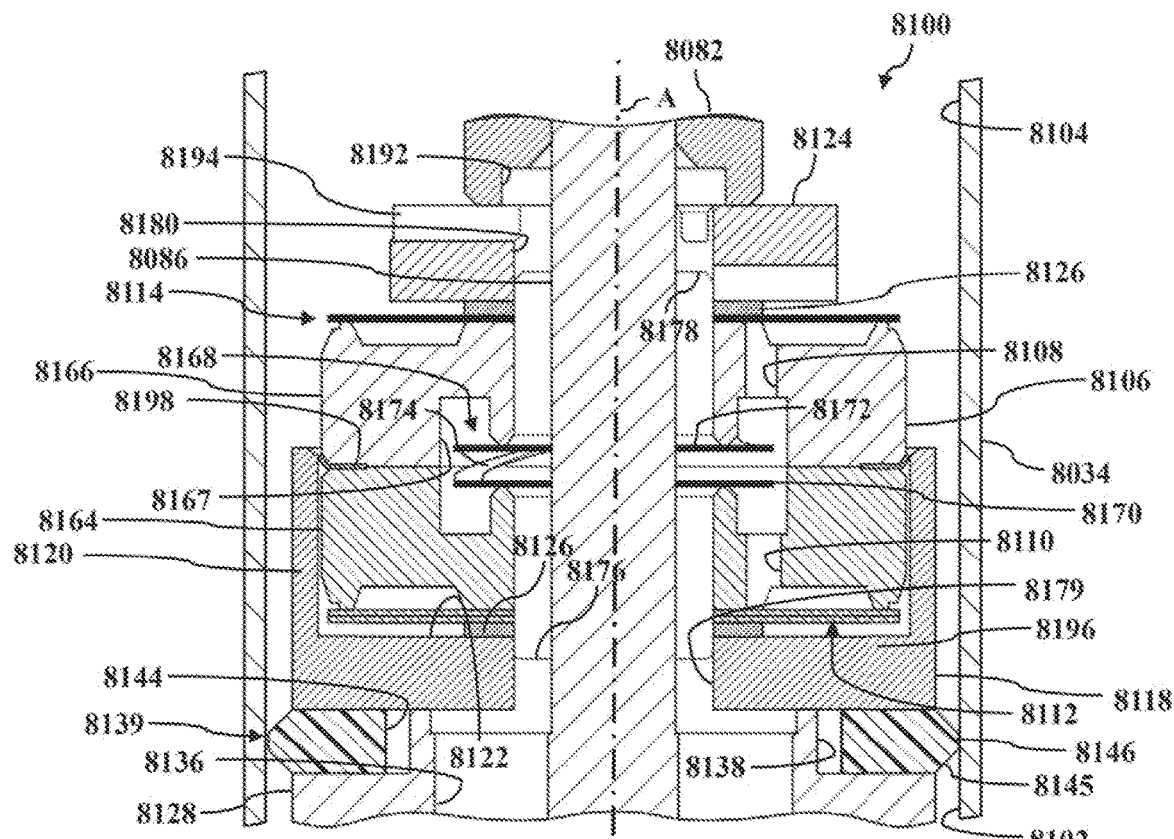
FIG. 24 is a cross-sectional view of the hydraulic compression stop in accordance with another embodiment the present invention.
Figure 25:
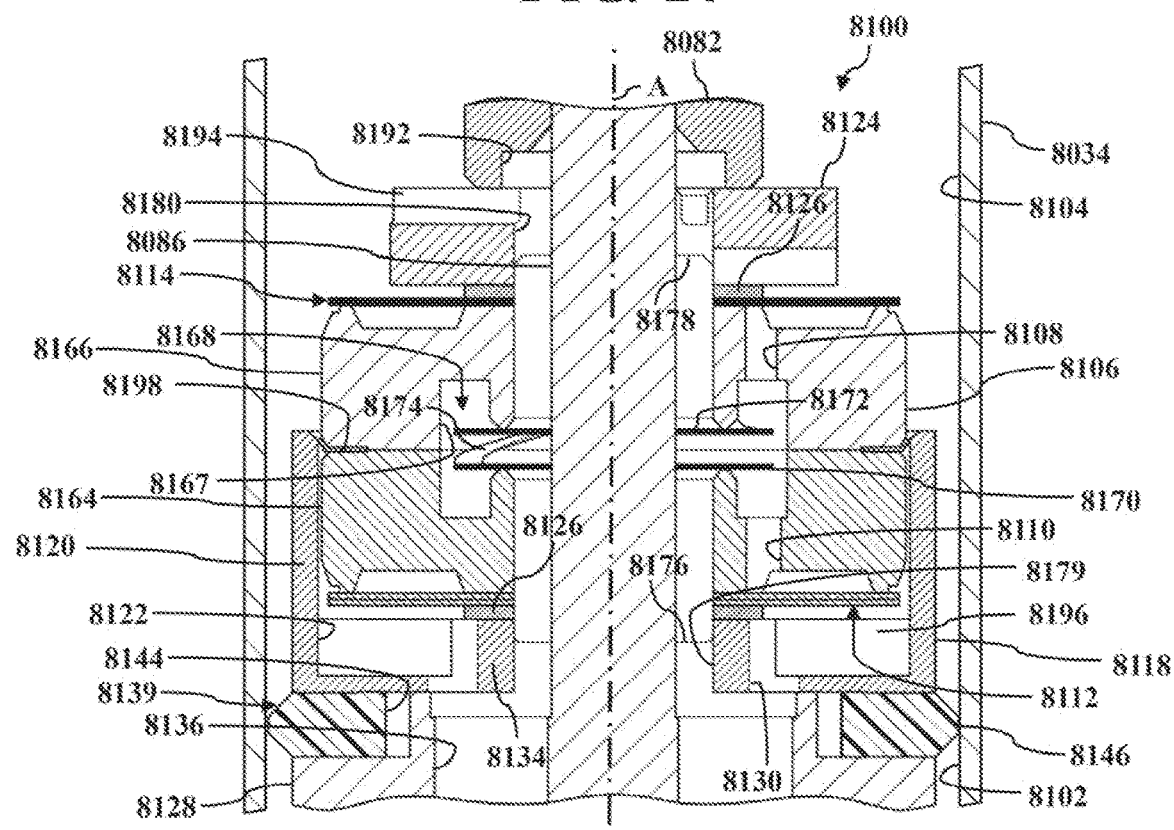
FIG. 25 is a cross-sectional view of the hydraulic compression stop in accordance with another embodiment the present invention.

According to an embodiment of the present invention as generally shown in FIGS. 24-25, the additional piston 8100 includes a main body 8106, having a generally cylindrical shape, extending about the center axis A. The main body 8106 defines a compression channel 8108 and a rebound channel 8110 for allowing fluid to flow through the additional piston 8100 during the compression stroke and the rebound stroke, respectively. A pair of valve stacks 8112, 8114, each having a generally cylindrical shape, are disposed on the center axis A and spaced apart from one another by the main body 8106. The pair of valve stacks 8112, 8114 includes a first valve stack 8112 and a second valve stack 8114, with the first valve stack 8112 engaging the main body 8106 of the additional piston 8100 and selectively covering the rebound channel 8110 to control fluid flow through the rebound channel 8110. The second valve stack 8114 engages the main body 8106 of the additional piston 8100 and selectively covers the compression channel 8108 to control fluid flow through the compression channel 8108. A rebound retainer 8118, having a cylindrical shape, is disposed on the center axis A and extends toward the first valve stack 8112 to limit deflection of the first valve stack 8112. A collar 8120 extends from a periphery of the rebound retainer 8118 about the center axis A to engage the main body 8106 and define a cavity 8122 extending between the rebound retainer 8118 and the main body 8106 for housing the first valve stack 8112.

A compression retainer 8124, having an annular shape, is disposed on the center axis A adjacent the second valve stack 8114 to limit deflection of the second valve stack 8114. A pair of spacers 8126, each having an annular shape, includes one spacer 8126 sandwiched between the first valve stack 8112 and the rebound retainer 8118 and another spacer 8126 sandwiched between the second valve stack 8114 and the compression retainer 8124. A securing member 8128, having an annular shape and coupled to the piston rod 66 for securing the additional piston 8100 to the piston rod 66, and the piston rod extender 8082, sandwich the rebound retainer 8118, the main body 8106, and the compression retainer 8124 together. The securing member 8128 may be a bolt having a stem portion that forms the threaded projection 8086. It should be appreciated that the terminal end of the piston rod extender 8082 may be a rod tenon.

The rebound retainer 8118 defines a plurality of passages 8130 spaced circumferentially about the center axis A in fluid communication with the rebound channel 8110 and the compression channel 8108. The securing member 8128 defines a plurality of perforations 8136 spaced circumferentially about the center axis A extending between the compression chamber 8102 and the plurality of passages 8130 to provide fluid communication between the compression chamber 8102 and the cavity 8122.

The securing member 8128 defines an outer groove 8138 extending radially inwardly toward the center axis A for receiving a piston ring 8139. In some embodiments, the outer groove 8138 is defined on an outer surface of the bolt for receiving the piston ring 8139. The piston ring 8139 is sandwiched between the additional piston 8100 and the securing member 8128 and located in the outer groove 8138. The piston ring 8139 is radially spaced from the securing member 8128 to allow the piston ring 8139 to move radially between an expanded position with the piston ring 8139 spaced from the housing 8034 and a compressed position with the piston ring 8139 engaging the housing 8034. The piston ring 8139 has an interior surface 8144 and an exterior surface 8145 with the interior surface 8144 being flat and the exterior surface 8145 being tapered toward the housing 8034 to form a contacting surface 8146. In the expanded position, the contacting surface 8146 may be disposed radially outward from the additional piston 8100 to allow the piston ring 8139 to engaging the housing 8034. In this way, piston ring 8139 may align the additional piston 8100 with the housing 8034 during a compression stroke and a rebound stroke. Because the piston ring 8139 may not be axially moveable, high pressure influence is limited on the interior surface 8144 and noise caused by movement of the piston ring 8139 may be reduced. It should be appreciated that there may be no limitation to the number of discs for each of the pair of valve stacks 8112, 8114. The number of discs may not affect the axial clearance of the piston ring 8139.

The additional piston 8100 includes a bottom portion 8164 and a top portion 8166, each having a cylindrical shape and disposed on the center axis A, engaging one another to establish the main body 8106 and the outer groove 8138 between the top portion 8166 and the bottom portion 8164. The main body 8106 defines a hollow 8167 extending between the top portion 8166 and the bottom portion 8164 about the center axis A. A valve assembly 8168 is disposed in the hollow 8167 and extends between the bottom portion 8164 and the top portion 8166 for controlling flow through the additional piston 8100. The valve assembly 8168 includes a compression disc 8170 engaging the bottom portion 8164 to control fluid flow through the compression channel 8108 and a rebound disc 8172 engaging the top portion 8166 to control fluid flow through the rebound channel 8110. The compression disc 8170 and the rebound disc 8172 are biased against one another and biased against the main body 8106 via a spring disc 8174 extending between the compression disc 8170 and the rebound disc 8172. In this way, the compression disc 8170 is biased to seal off the hollow 8167 from the fluid chamber 40, 42. In some embodiments, the top portion 8166 and the bottom portion 8164 are structurally identical.

The additional piston 8100 includes a plurality of fingers 8176, 8178 spaced from one another about the center axis A and extending outwardly from the main body 8106 and adjacent the piston rod 66. The plurality of fingers 8176, 8178 includes a plurality of first fingers 8176 and a plurality of second fingers 8178, with the plurality of first fingers 8176 extending outwardly from the bottom portion 8164 and the plurality of second fingers 8178 extending outwardly from the top portion 8166. At least one of the rebound retainer 8118 and the compression retainer 8124 axially defines a central hole 8179, 8180 for receiving the plurality of fingers. In particular, the rebound retainer 8118 may define a first central hole 8179 and the compression retainer 8124 may define a second central hole 8180. Each central hole 8179, 8180 has a diameter greater than a diameter of the piston rod extender 8082 of the piston rod 66 to allow the plurality of first fingers 8176 to engage the first central hole 8179 and to allow the plurality of second fingers 8178 to engage the second central hole 8180. In other words, the rebound retainer 8118 is configured to receive the plurality of first fingers 8176 and the compression retainer 8124 is configured to receive the plurality of second fingers 8178. The central hole 8179, 8180 may be in fluid communication with one of the rebound channel 8110 and the compression channel 8108. The first central hole 8179 may be in fluid communication with one of the compression channel 8108 and the rebound channel 8110, and the second central hole 8180 may be in fluid communication with another of the compression channel 8108 and the rebound channel 8110. In particular, the first central hole 8179 may be in fluid communication with the compression channel 8108, and the second central hole 8180 may be in fluid communication with the rebound channel 8110.

The rod tenon defines a bore 8192 extending radially inwardly for receiving the stem portion of the bolt and to allow the working fluid to flow around the stem portion. The compression retainer 8124 defines a plurality of indentations 8194 extending radially outwardly between the fluid chamber 40, 42 and the central hole 8179, 8180 to allow fluid communication between the fluid chamber 40, 42 and one of the compression channel 8108 and the rebound channel 8110. In particular, the plurality of indentations 8194 is configured to provide fluid communication between the fluid chamber 40, 42 and the rebound channel 8110.

The rebound retainer 8118 includes at least one vane 8196 extending radially inwardly from the collar 8120 to the protrusion 8134 to limit deflection of the first valve stack 8112 and to interconnect the collar 8120 and the protrusion 8134. A sealing ring 8198 is sandwiched between the top portion 8166, the bottom portion 8164, and the collar 8120 to seal the cavity 8122 from the rebound chamber 8104. The bottom portion 8164 of the main body 8106 is disposed in the cavity 8122 with the collar 8120 of the rebound retainer 8118 surrounding the bottom portion 8164.

It should be appreciated that the term "compression" as used herein with reference to particular elements of the high compression stop 90 refers to these elements or parts of elements which are adjacent to (or facing) the compression chamber 102 or, in a case of working fluid flow direction, it refers to this flow direction that takes place during the compression stroke of the damper assembly 20. Similarly the term "rebound" as used in this specification with reference to particular elements of the high compression stop 90 refers to these elements or these parts of particular elements which are adjacent to (or facing) the rebound chamber 104 or, in a case of working fluid flow direction, it refers to this flow direction that takes place during the rebound stroke of the damper assembly 20.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A hydraulic damper assembly comprising:
    a housing disposed on a center axis extending between a first end and a second end defining a fluid chamber extending along said center axis for containing a working fluid;
    a main piston slidably disposed in said fluid chamber dividing said fluid chamber into a first chamber and a second chamber, said first chamber extending between said first end and said main piston and said second chamber extending between said second end and said main piston;
    a piston rod extending along said center axis and attached to said main piston for moving said main piston between a compression stroke and a rebound stroke;
    an additional piston, located in said fluid chamber, coupled to said piston rod and axially spaced from said main piston to provide an additional damping force during said compression stroke and said rebound stroke;
    said additional piston including a main body defining a compression channel and a rebound channel for allowing the working fluid to flow through said additional piston during said compression stroke and said rebound stroke, respectively;
    a securing member attached to said piston rod for securing said additional piston to said piston rod, said securing member defining an outer groove extending radially inwardly toward said center axis; and
    a piston ring located in said outer groove between said additional piston and said securing member, wherein said piston ring is radially spaced from said securing member to allow said piston ring to move radially between an expanded position and a compression position, with said expanded position being defined as said piston ring being spaced from said housing and said compressed position being defined as said piston ring being in engagement with said housing to align said additional piston with said housing,
    wherein the hydraulic damper assembly further includes a rebound retainer disposed between said main body and said securing member, said outer groove being bounded by said rebound retainer and said securing member.

2. The hydraulic damper assembly as set forth in claim 1, wherein said securing member is a nut and said outer groove is defined on an outer surface of said nut.

3. The hydraulic damper assembly as set forth in claim 1, wherein said securing member is a bolt having a stem portion for threadedly engaging said piston rod and said outer groove is defined on an outer surface of said bolt.

4. A hydraulic damper assembly comprising:
a housing disposed on a center axis extending between a first end and a second end defining a fluid chamber extending along said center axis for containing a working fluid;
a main piston slidably disposed in said fluid chamber dividing said fluid chamber into a first chamber and a second chamber, said first chamber extending between said first end and said main piston and said second chamber extending between said second end and said main piston;
a piston rod extending along said center axis and attached to said main piston for moving said main piston between a compression stroke and a rebound stroke;
an additional piston, located in said fluid chamber, coupled to said piston rod and axially spaced from said main piston to provide an additional damping force during said compression stroke and said rebound stroke;
said additional piston including a main body defining a compression channel and a rebound channel for allowing fluid to flow through said additional piston during said compression stroke and said rebound stroke, respectively;
said additional piston including a plurality of fingers spaced from one another and extending outwardly from said main body; and
at least one retainer axially spaced from said additional piston having a central hole for receiving said plurality of fingers, wherein said central hole is in fluid communication with one of said compression channel and said rebound channel.

5. The hydraulic damper assembly as set forth in claim 4, wherein said main body includes a top portion and a bottom portion; and
wherein said plurality of fingers includes a plurality of first fingers and a plurality of second fingers with said plurality of first fingers extending outwardly from said bottom portion and said plurality of second fingers extending outwardly from said top portion.

6. The hydraulic damper assembly as set forth in claim 5, wherein said at least one retainer includes a rebound retainer and a compression retainer spaced from one another by said main body, said rebound retainer defining a first central hole and said compression retainer defining a second central hole; and
wherein said rebound retainer is configured to receive said plurality of first fingers and said compression retainer is configured to receive said plurality of second fingers.

7. The hydraulic damper assembly as set forth in claim 6, wherein said first central hole is in fluid communication with one of said compression channel and said rebound channel; and
wherein said second central hole is in fluid communication with another one of said compression channel and said rebound channel.

8. The hydraulic damper assembly as set forth in claim 6, further including a rod tenon attached to said piston rod and disposed adjacent said compression retainer;
wherein said rod tenon defines at least one bore extending radially inwardly from said fluid chamber to provide fluid communication between said rebound channel and said fluid chamber; and wherein said compression retainer defines an indentation extending radially outwardly between said fluid chamber and said second central hole to allow fluid communication between said fluid chamber and said compression channel.

9. The hydraulic damper assembly as set forth in claim 4, wherein said at least one retainer defines a slot extending radially outwardly between said fluid chamber and said central hole to allow fluid communication between said fluid chamber and one of said compression channel and said rebound channel.

10. The hydraulic damper assembly as set forth in claim 9, wherein said slot is configured to provide fluid communication between said fluid chamber and said compression channel.

11. The hydraulic damper assembly as set forth in claim 9, wherein said slot is configured to provide fluid communication between said fluid chamber and said rebound channel.

12. The hydraulic damper assembly as set forth in claim 5, further including a piston ring sandwiched between said top portion and said bottom portion and being radially moveable between an expanded position with said piston ring spaced from said housing and a compressed position with said piston ring engaging said housing.

13. The hydraulic damper assembly as set forth in claim 4, wherein said additional piston defines a hollow in fluid communication with said compression channel and said rebound channel; and
wherein said additional piston includes a valve assembly disposed in said hollow for controlling fluid communication between said fluid chamber and said hollow.

14. An additional piston for displacement in a housing of a hydraulic damper assembly, said additional piston comprising:
a main body extending about a center axis defining a compression channel and a rebound channel for allowing a fluid to flow through said additional piston during a compression stroke and a rebound stroke, respectively;
said main body including a bottom portion and a top portion engaging one another to establish said main body and define a hollow extending between said bottom portion and said top portion; and
a rebound retainer defining a first central hole and a plurality of passages radially spaced from said first central hole, said first central hole being in fluid communication with said compression channel and said plurality of passages being in fluid communication with said rebound channel;
said rebound retainer including a collar extending about said center axis to define a cavity for receiving said main body; and
wherein said cavity is in fluid communication with said rebound channel, said hollow, and said plurality of passages.

15. The additional piston as set forth in claim 14 further including valve stack disposed in said cavity for controlling fluid flow through said additional piston; and
wherein said rebound retainer includes at least one vane extending radially inwardly from said collar to limit deflection of said valve stack.

16. The additional piston as set forth in claim 14 further including a sealing ring sandwiched between said top portion, said bottom portion, and said collar to seal said cavity.

17. The additional piston as set forth in claim 14 further including a plurality of first fingers spaced from one another and extending outwardly from said bottom portion; and wherein said rebound retainer is configured to receive said plurality of first fingers to provide fluid communication between said first central hole, said hollow, and said compression channel.

18. The additional piston as set forth in claim 17 further including a compression retainer spaced from said rebound retainer by said main body defining a second central hole;

a plurality of second fingers spaced from one another and extending outwardly from said top portion; and wherein said compression retainer is configured to receive said plurality of second fingers to provide fluid communication between said second central hole, said hollow, and said rebound channel.

19. The additional piston as set forth in claim 18, wherein said compression retainer defines an indentation extending radially outwardly from said second central hole to provide fluid communication between said indentation and said rebound channel.

20. The additional piston as set forth in claim 14, further including a securing member defining an outer groove for receiving a piston ring, wherein said outer groove is bounded by said rebound retainer and wherein piston ring is radially moveable between an expanded position with said piston ring spaced from said housing and a compressed position with said piston ring engaging said housing to align said additional piston with said housing.

21. The additional piston as set forth in claim 14, further including a valve assembly disposed in said hollow for controlling working fluid flow through said hollow.

22. An additional piston for displacement in a housing of a hydraulic damper assembly, said additional piston comprising:

a main body extending about a center axis defining a compression channel and a rebound channel for allowing fluid to flow through said additional piston during a compression stroke and a rebound stroke, respectively;

said main body including a bottom portion and a top portion engaging one another to establish said main body and define a hollow extending between said bottom portion and said top portion;

a rebound retainer defining a first central hole and a plurality of passages spaced radially outwardly from said first central hole, said first central hole in fluid communication with said compression channel and said plurality of passages in fluid communication with said rebound channel;

said rebound retainer including a collar extending about said center axis to define a cavity for receiving said main body; and a valve stack disposed in said cavity for controlling fluid flow through said additional piston, wherein said rebound retainer includes at least one vane extending radially inwardly from said collar to limit deflection of said valve stack.

23. The additional piston as set forth in claim 22, wherein said cavity is in fluid communication with said rebound channel, said hollow, and said plurality of passages.

24. The additional piston as set forth in claim 22 further including a sealing ring sandwiched between said top portion, said bottom portion, and said collar to seal said cavity.

25. The additional piston as set forth in claim 22 further including a plurality of first fingers spaced from one another and extending outwardly from said bottom portion; and wherein said rebound retainer is configured to receive said plurality of first fingers to provide fluid communication between said first central hole, said hollow, and said compression channel.

26. The additional piston as set forth in claim 25 further including a compression retainer spaced from said rebound retainer by said main body defining a second central hole;

a plurality of second fingers spaced from one another and extending outwardly from said top portion; and wherein said compression retainer is configured to receive said plurality of second fingers to provide fluid communication between said second central hole, said cavity, and said rebound channel.

27. The additional piston as set forth in claim 26, wherein said compression retainer defines an indentation extending radially outwardly from said second central hole to provide fluid communication between said indentation and said rebound channel.

28. The additional piston as set forth in claim 22, further including a securing member defining an outer groove for receiving a piston ring, wherein said outer groove is bounded by said rebound retainer; and wherein piston ring is radially moveable between an expanded position with said piston ring spaced from said housing and a compressed position with said piston ring engaging said housing to align said additional piston with said housing.

29. The additional piston as set forth in claim 22, further including a valve assembly disposed in said hollow for controlling fluid communication between said hollow and said fluid chamber.

30. A hydraulic damper assembly comprising:

a housing disposed on a center axis extending between a first end and a second end defining a fluid chamber extending along said center axis for containing a working fluid;

a main piston slidably disposed in said fluid chamber dividing said fluid chamber into a first chamber and a second chamber, said first chamber extending between said first end and said main piston and said second chamber extending between said second end and said main piston;

a piston rod extending along said center axis and attached to said main piston for moving said main piston between a compression stroke and a rebound stroke;

an additional piston, located in said fluid chamber, coupled to said piston rod and axially spaced from said main piston to provide an additional damping force during said compression stroke and said rebound stroke;

said additional piston including a main body defining a compression channel and a rebound channel for allowing the working fluid to flow through said additional piston during said compression stroke and said rebound stroke, respectively;

a securing member attached to said piston rod for securing said additional piston to said piston rod, said securing member defining an outer groove extending radially inwardly toward said center axis; and a piston ring located in said outer groove between said additional piston and said securing member, wherein said piston ring is radially spaced from said securing member to allow said piston ring to move radially between an expanded position and a compression position, with said expanded position being defined as said piston ring being spaced from said housing and said compressed position being defined as said piston ring being in engagement with said housing to align said additional piston with said housing,
wherein said securing member is a bolt having a stem portion for threadedly engaging said piston rod and said outer groove is defined on an outer surface of said bolt.

* * * * *